(12) United States Patent
Sonoda et al.

(10) Patent No.: US 10,890,441 B2
(45) Date of Patent: Jan. 12, 2021

(54) SHAPE INSPECTION APPARATUS AND SHAPE INSPECTION METHOD

(71) Applicant: NIPPON STEEL CORPORATION, Tokyo (JP)

(72) Inventors: Takayuki Sonoda, Tokyo (JP); Nobuhiro Furuya, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/649,600

(22) PCT Filed: Nov. 27, 2018

(86) PCT No.: PCT/JP2018/043550
§ 371 (c)(1),
(2) Date: Mar. 20, 2020

(87) PCT Pub. No.: WO2019/103153
PCT Pub. Date: May 31, 2019

(65) Prior Publication Data
US 2020/0386541 A1 Dec. 10, 2020

(30) Foreign Application Priority Data
Nov. 27, 2017 (JP) .................................. 2017-226968

(51) Int. Cl.
*G01B 11/25* (2006.01)
*G01B 11/30* (2006.01)
(Continued)

(52) U.S. Cl.
CPC .............. *G01B 11/25* (2013.01); *G01B 11/26* (2013.01); *G01B 11/306* (2013.01);
(Continued)

(58) Field of Classification Search
CPC ... G01N 2021/8845; G01N 2021/8905; G01N 2021/8909; G01N 2021/8911;
(Continued)

(56) References Cited

U.S. PATENT DOCUMENTS 3,187,185 A * 6/1965 Milnes .................... B21B 38/04
250/222.1
7,777,897 B1 * 8/2010 Gibbons .............. G01B 11/303
356/601

(Continued)

FOREIGN PATENT DOCUMENTS

JP 58115314 A * 7/1983 ........... G01B 11/303
JP 2000-241362 A 9/2000
(Continued)

OTHER PUBLICATIONS

Decision to Grant a Patent dated Dec. 17, 2019, issued in JP-A 2019-555404.
(Continued)

*Primary Examiner* — Gordon J Stock, Jr.
(74) *Attorney, Agent, or Firm* — Birch, Stewart, Kolasch & Birch, LLP

(57) ABSTRACT

A shape inspection apparatus for inspecting a strip-shaped body includes: a line sensor camera; a first illumination light source and a second illumination light source; a measurement control unit; and a data processing unit. The measurement control unit controls the lighting timings and light emission time periods as well as the line image acquisition timing based on a line speed so that overlapping of photographing ranges does not occur between a first line image acquired within a light emission time period of the first illumination light source and a second line image acquired within a light emission time period of the second illumination light source. The data processing unit calculates an inclination of the surface of the strip-shaped body based on
(Continued)

a differential line image obtained based on the first line image and the second line image.

14 Claims, 21 Drawing Sheets

(51) Int. Cl.
    *G01N 21/89*     (2006.01)
    *G01B 11/26*     (2006.01)

(52) U.S. Cl.
    CPC . *G01N 21/8901* (2013.01); *G01N 2021/8908* (2013.01); *G01N 2021/8918* (2013.01)

(58) Field of Classification Search
    CPC ... G01N 2021/8912; G01N 2021/8918; G01N 2021/8924; G01N 2021/8925; G06T 2207/10004; G06T 2207/10144; G06T 2207/10152; G06T 2207/30136; G06T 7/0004; G06T 7/50; G06T 7/55; G06T 7/586; G06T 7/60; G01B 11/02; G01B 11/022; G01B 11/06; G01B 11/0608; G01B 11/0691; G01B 11/22; G01B 11/24; G01B 11/25; G01B 11/2513; G01B 11/26; G01B 11/30; G01B 11/303; G01B 11/306
See application file for complete search history.

(56) References Cited

U.S. PATENT DOCUMENTS

| | | | | |
|---|---|---|---|---|
| 9,683,944 | B2* | 6/2017 | Moroli | G01N 21/8806 |
| 9,903,710 | B2* | 2/2018 | Konno | G01N 21/8851 |
| 9,970,750 | B2* | 5/2018 | Akagi | G01N 21/8851 |
| 10,290,113 | B2* | 5/2019 | Akagi | G06T 7/40 |
| 10,352,867 | B2* | 7/2019 | Umemura | G01J 3/504 |
| 10,451,410 | B2* | 10/2019 | Hibi | G01B 11/02 |
| 2018/0087898 | A1 | 3/2018 | Akagi et al. | |
| 2018/0367722 | A1* | 12/2018 | Hashiguchi | H04N 5/2256 |
| 2019/0178812 | A1* | 6/2019 | Richard | G01N 21/8806 |
| 2020/0292465 | A1* | 9/2020 | Konno | G01N 21/892 |

FOREIGN PATENT DOCUMENTS

| | | |
|---|---|---|
| JP | 2015-129715 A | 7/2015 |
| JP | 6040930 B2 | 12/2016 |
| JP | 2017-9523 A | 1/2017 |
| WO | WO 2016/194698 A1 | 12/2016 |

OTHER PUBLICATIONS

International Preliminary Report on Patentability dated Oct. 23, 2019, issued in PCT/JP2018/043550 (Form PCT/IPEA/409).
International Search Report dated Jan. 8, 2019 for PCT/JP2018/043550 (PCT/ISA/210).

\* cited by examiner

SHAPE INSPECTION APPARATUS AND SHAPE INSPECTION METHOD

TECHNICAL FIELD

The present invention relates to a shape inspection apparatus and a shape inspection method for inspecting a strip-shaped body.

BACKGROUND ART

One of the methods for measuring the surface shape of a measurement object is to use illumination light utilizing a fluorescent lamp, a light emitting diode (LED), a laser beam or the like, and photograph reflection light of the illumination light that is reflected from the measurement object to measure the surface shape of the measurement object.

For example, as a surface defect detection method that optically detects surface defects of a steel material, Patent Document 1 that is mentioned hereunder discloses a surface defect detection method that includes an radiation step of utilizing two or more discriminable light sources to radiate illumination light from different directions at the same inspection target region, and a detection step of acquiring images resulting from reflection light of the respective illumination lights and subjecting the acquired images to differential processing to thereby detect a surface defect in the inspection target region.

Further, as other surface defect detection methods that optically detect surface defects of a steel material, for example, Patent Document 2 and Patent Document 3 disclose a surface defect detection method that includes an radiation step of utilizing two or more discriminable light sources to continuously radiate linear illumination light in a direction that is orthogonal to the direction of movement of a steel material at approximately the same incident angle from different directions at the same inspection target region, and a detection step of acquiring images resulting from reflection light from the irradiated position of each linear illumination light and subjecting the acquired images to differential processing to thereby detect a surface defect in the inspection target region.

LIST OF PRIOR ART DOCUMENTS

Patent Documents

Patent Document 1: JP6040930B
Patent Document 2: JP2017-9523A
Patent Document 3: JP2000-241362A

SUMMARY OF INVENTION

Technical Problem

According to the method disclosed in the aforementioned Patent Document 1, a surface defect in an inspection target region is detected by acquiring images of reflection light of illumination light from two or more discriminable light sources by means of two area sensor cameras, and determining a difference between the acquired images. At such time, in order to ensure that the images on which differential processing is performed are images photographed at the same position of the inspection target region, it is necessary to ensure that the positions of the inspection target region which are photographed by the respective area sensor cameras do not, as much as possible, deviate from each other. However, eliminating a positional deviation between images that occurs depending on the line speed is difficult because of the structure of the equipment, and there is a limit to the degree to which the accuracy of detecting surface defects can be improved. In particular, because a positional deviation increases in size at an inspection target region that is moving at a high speed, the surface defect detection method of the aforementioned Patent Document 1 is not suitable for inspecting an inspection target region that moves at a high speed. Further, because two-dimensional photographing in the direction in which the line is traveling is also performed using area sensor cameras, depending on the position in the direction in which the line is traveling, a difference arises between angles formed by the optical axes of the respective plurality of light sources and the optical axes of the area sensor cameras. Therefore, the unevenness sensitivity with respect to differential processing of a photographed image is not constant, and a pattern that acts as a disturbance cannot be completely removed.

Further, in the aforementioned Patent Document 2, in addition to a case of using an image acquired using an area sensor camera, a surface defect detection method is also considered for a case that uses an image acquired using a line sensor camera. In the methods described in Patent Document 2 and Patent Document 3, similarly to Patent Document 1, it is described that in order to ensure the images on which differential processing is to be performed are images photographed at the same position of the inspection target region, it is necessary to ensure as much as possible that there is no deviation between the positions of the inspection target region that are photographed. Therefore, in the methods described in Patent Document 2 and Patent Document 3, immediately after light emission of one light source, the other light source is caused to emit light, to thereby ensure that the lights emitted by the two light sources do not overlap, and furthermore, the photographing cycle is shortened and positional deviations in the inspection target region accompanying movement of the steel material are reduced. Consequently, the light emission time period of the illumination light must also be shortened, and there is a limit to obtaining a sufficient quantity of light, and there is also a restriction on the data processing speed, and for this reason it is difficult to support an increase in the line speed.

An objective of the present invention, which has been made in consideration of the above problems, is to provide a novel and improved shape inspection apparatus and shape inspection method for a strip-shaped body, which are capable of reliably measuring the surface shape of a measurement object even when the line speed is increased.

Solution to Problem

To solve the aforementioned problems, according to a certain aspect of present invention, there is provided a shape inspection apparatus for detecting a surface shape of a strip-shaped body that includes: a line sensor camera configured to photograph a surface of a strip-shaped body at which illumination light of a first illumination light source or a second illumination light source is radiated to acquire line images; a first illumination light source and a second illumination light source that are arranged so as to be symmetric with respect to a specular reflection direction of an optical axis of the line sensor camera, the first illumination light source and the second illumination light source being configured to successively and alternately radiate strip-shaped illumination light at a photographing position of the line sensor camera; a measurement control unit configured to control a lighting timing and a light emission time period of each of the first illumination light source and the second illumination light source, and a line image acquisition timing of the line sensor camera, and a data processing unit configured to process a plurality of line images acquired by the line sensor camera to calculate an inclination of the surface of the strip-shaped body; wherein: a line image acquired by the line sensor camera when a first illumination light is being radiated from the first illumination light source is taken as a first line image, and a line image acquired by the line sensor camera when a second illumination light is being radiated from the second illumination light source is taken as a second line image, and the measurement control unit controls the lighting timing and the light emission time period as well as the line image acquisition timing based on a line speed so that photographing ranges are not overlapped between the first line image and the second line image, the line speed being a relative speed between the strip-shaped body and the line sensor camera, and the data processing unit calculates an inclination of the surface of the strip-shaped body based on a differential line image that is obtained based on the first line image and the second line image.

The measurement control unit may provide, as a photographing interval, a time period in which photographing is not performed after previous photographing by the line sensor camera ends until subsequent photographing by the line sensor camera starts.

When a length in a conveyance direction of the strip-shaped body per picture element of the line sensor camera on the strip-shaped body is represented by "D", the measurement control unit may control the line image acquisition timing so that the photographing interval b satisfies the following formula:

The data processing unit may acquire, as the differential line image, a difference between a line image acquired at an $n^{th}$ line image acquisition timing and a line image acquired at at least one of an $n-1^{th}$ line image acquisition timing and an $n+1^{th}$ line image acquisition timing, and calculate an inclination of the surface of the strip-shaped body.

Alternatively, the data processing unit may acquire, as the differential line image, a difference between a line image acquired at an $n^{th}$ line image acquisition timing and a line image interpolated from a line image acquired at or prior to an $n-1^{th}$ line image acquisition timing and a line image acquired at or subsequent to an $n+1^{th}$ line image acquisition timing, and calculate an inclination of the surface of the strip-shaped body.

The data processing unit may integrate inclinations of the surface of the strip-shaped body in a longitudinal direction and calculate a height of the surface of the strip-shaped body.

The shape inspection apparatus may further include at least one supplementary illumination light source that radiates strip-shaped illumination light at the strip-shaped body. At such time, the measurement control unit causes the first illumination light source, the second illumination light source and the supplementary illumination light source to emit light successively one by one at a line image acquisition timing of the line sensor camera; and the data processing unit calculates an inclination of the surface of the strip-shaped body based on the differential line image that is obtained based on the first line image and the second line image, and identifies a surface state of the strip-shaped body based on a line image that is acquired by the line sensor camera when supplementary illumination light is being radiated from the supplementary illumination light source.

Further, to solve the aforementioned problems, according to a different aspect of the present invention there is provided a shape inspection method for detecting a surface shape of a strip-shaped body, wherein, above a line on which the strip-shaped body is conveyed are arranged: a line sensor camera configured to photograph a surface of the strip-shaped body to acquire a line image, and a first illumination light source and a second illumination light source that are arranged so as to be symmetric with respect to a specular reflection direction of an optical axis of the line sensor camera, the first illumination light source and the second illumination light source being configured to successively and alternately radiate strip-shaped illumination light at a photographing position of the line sensor camera, and wherein: a line image acquired by the line sensor camera when a first illumination light is being radiated from the first illumination light source is taken as a first line image, and a line image acquired by the line sensor camera when a second illumination light is being radiated from the second illumination light source is taken as a second line image; a lighting timing and light emission time period of the first illumination light source and the second illumination light source and a line image acquisition timing of the line sensor camera are controlled based on a line speed so that photographing ranges are not overlapped between the first line image and the second line image, the line speed being a relative speed between the strip-shaped body and the line sensor camera; and an inclination of the surface of the strip-shaped body is calculated based on a differential line image that is obtained based on the first line image and the second line image.

Advantageous Effects of Invention

According to the present invention as described above, it is possible to reliably measure the surface shape of a measurement object even when a line speed is increased.

DESCRIPTION OF EMBODIMENTS

Hereinafter, preferred embodiments of the present invention will be described in detail with reference to the appended drawings. In the present description and the drawings, elements that have substantially the same function and structure are denoted with the same reference signs, and repeated explanation is omitted.

1. First Embodiment

1-1. Outline of Shape Inspection Apparatus

Figure 1:
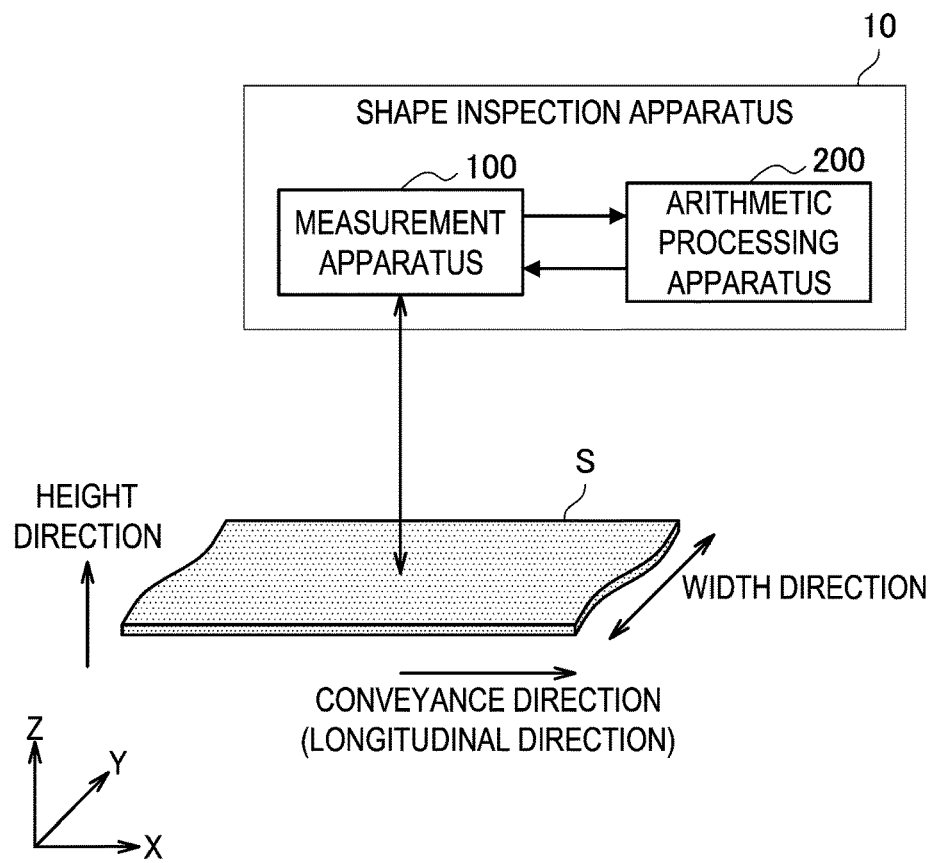
FIG. 1 is an explanatory diagram illustrating one configuration example of a shape inspection apparatus according to a first embodiment of the present invention.
Figure 2:
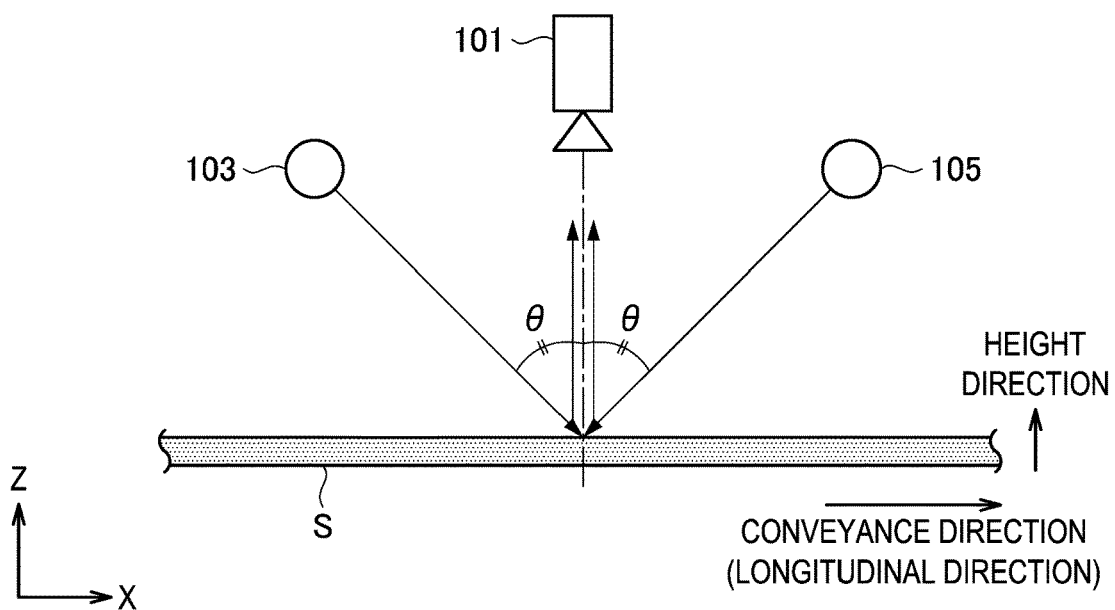
FIG. 2 is an explanatory diagram for describing the intensity of luminance of reflection light of illumination light that is acquired by a line sensor camera at a time when the surface of a strip-shaped body is level.
Figure 3:
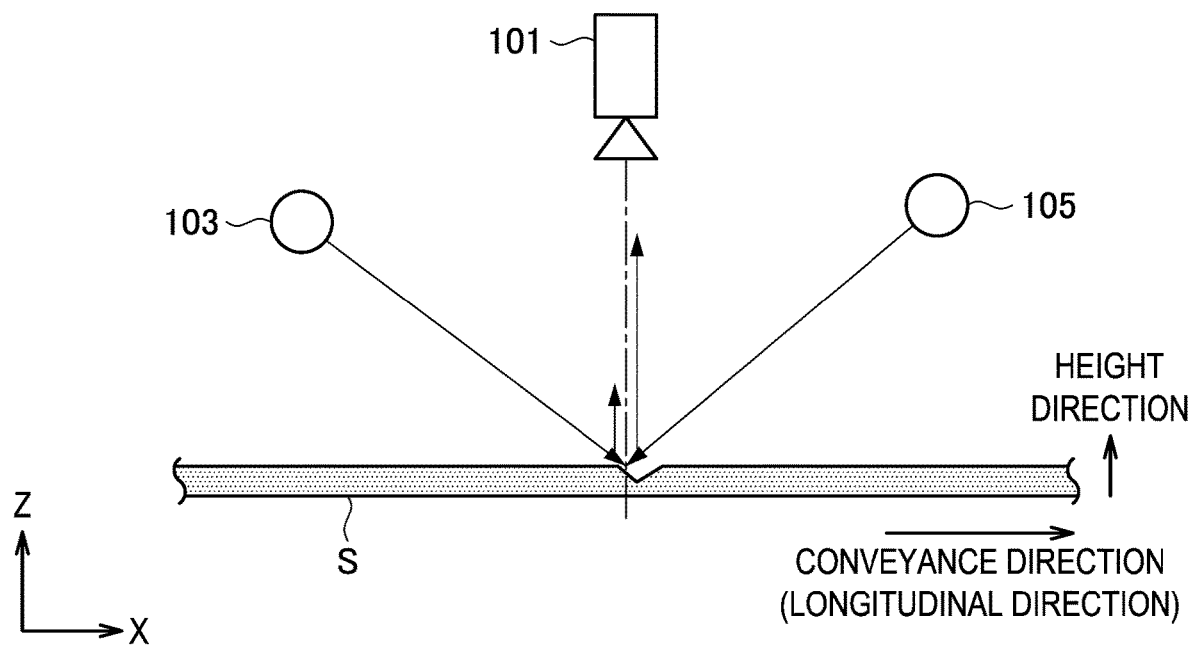
FIG. 3 is an explanatory diagram for describing the intensity of luminance of reflection light of illumination light that is acquired by a line sensor camera at a time when unevenness that is inclined with respect to a horizontal plane is present at the surface of a strip-shaped body, and shows the intensity of the luminance of reflection light at a slope that descends continuously to the right.
Figure 4:
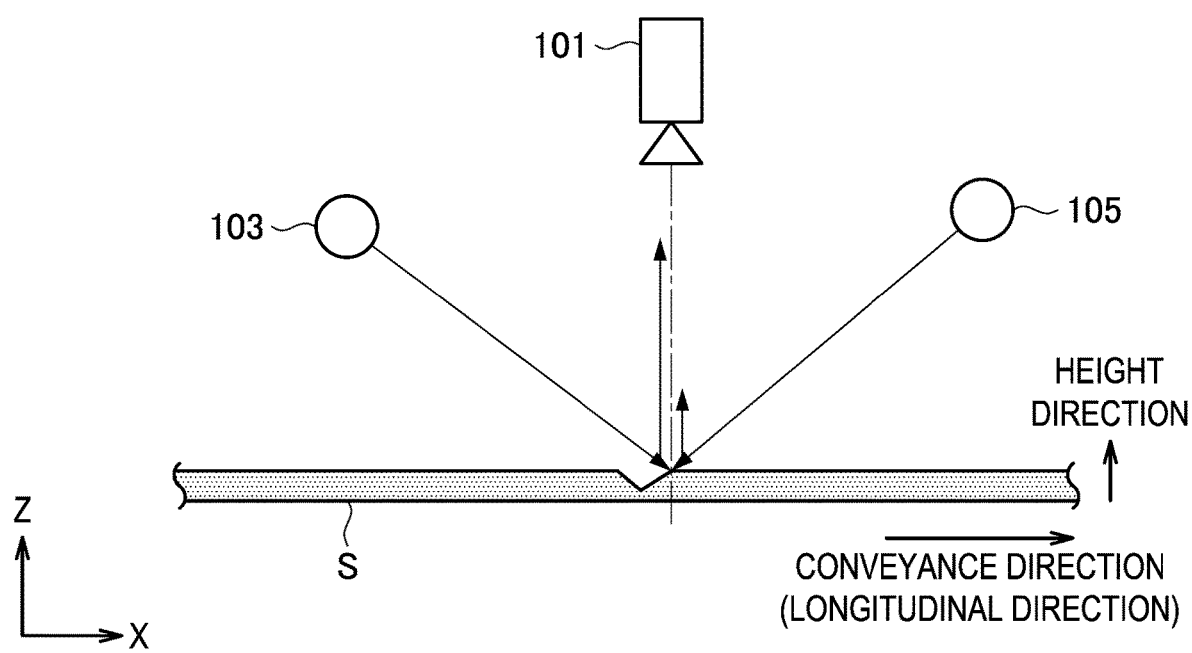
FIG. 4 is an explanatory diagram for describing the intensity of luminance of reflection light of illumination light that is acquired by a line sensor camera at a time when unevenness that is inclined with respect to a horizontal plane is present at the surface of a strip-shaped body, and shows the intensity of the luminance of reflection light at a slope that ascends continuously to the right.

First, an outline of a shape inspection apparatus for a strip-shaped body S (hereunder, also referred to simply as "shape inspection apparatus") 10 according to a first embodiment of the present invention will be described based on FIG. 1 to FIG. 4. FIG. 1 is an explanatory diagram illustrating one configuration example of the shape inspection apparatus 10 according to the present embodiment. Note that, in the following description, it is assumed that the strip-shaped body S is being conveyed in a predetermined direction on a conveyance line (not illustrated), and the conveyance direction of the strip-shaped body S corresponds to the longitudinal direction of the strip-shaped body S. FIG. 2 is an explanatory diagram for describing the intensity of luminance of reflection light of illumination light acquired by a line sensor camera 101 when the surface of the strip-shaped body S is level. FIG. 3 and FIG. 4 are explanatory diagrams for describing the intensity of luminance of reflection light of illumination light acquired by the line sensor camera 101 when unevenness that is inclined with respect to a horizontal plane is present at the surface of a strip-shaped body S.

The shape inspection apparatus 10 according to the present embodiment is an apparatus for detecting the surface shape (for example, unevenness shape) of various kinds of strip-shaped bodies S, such as a steel plate placed at a predetermined location or a steel plate conveyed on a predetermined conveyance line.

Here, a macroscopic shape of the strip-shaped body S is not particularly limited and may be, for example, a plate shape such as a slab or a billet, or may be a coil shape obtained by rolling up/winding up a metal plate. Further, components of the strip-shaped body S are also not particularly limited, and the strip-shaped body S may be various types of steel containing an iron element as the main component, various types of alloy of iron and other metal elements, or various types of nonferrous metal.

The shape inspection apparatus 10 according to the present embodiment mainly includes a measurement apparatus 100 and an arithmetic processing apparatus 200, as illustrated in FIG. 1.

Under control of the arithmetic processing apparatus 200, the measurement apparatus 100 radiates the strip-shaped body S (specifically, the surface of the strip-shaped body S) with illumination light from a first illumination light source 103 and a second illumination light source 105, respectively, and, by means of the line sensor camera 101, photographs the surface of the strip-shaped body S on which the illumination light is being radiated to thereby acquire a photographed image of the surface of the strip-shaped body S. The measurement apparatus 100 outputs a photographed image that is acquired to the arithmetic processing apparatus 200.

The arithmetic processing apparatus 200 controls measurement processing of the strip-shaped body S by the measurement apparatus 100. The arithmetic processing apparatus 200 also performs image processing on the photographed image acquired by the measurement apparatus 100, and calculates an inclination of the surface of the strip-shaped body S as information to be used for detecting the surface shape of the strip-shaped body S.

According to the present embodiment, as illustrated in FIG. 2, in the shape inspection apparatus 10, the first illumination light source 103 and the second illumination light source 105 are arranged so as to be symmetric with respect to the specular reflection direction of the optical axis of the line sensor camera 101. Further, the first illumination light source 103 and the second illumination light source 105 are lit alternately, and a plurality of line images are acquired by photographing the surface of the strip-shaped body S by means of the line sensor camera 101 within the respective light emission time periods of the first illumination light source 103 and the second illumination light source 105.

The arithmetic processing apparatus 200 calculates an inclination of the surface of the strip-shaped body S based on a difference between a line image (also referred to as "first line image") acquired by the line sensor camera 101 when a first illumination light is being radiated from the first illumination light source 103, and a line image (also referred to as "second line image") acquired by the line sensor camera 101 when a second illumination light is being radiated from the second illumination light source 105. For example, based on a photographed image generated by arranging the acquired line images in the photographing order, the arithmetic processing apparatus 200 separates the first line images to generate a first separated image that is composed of first line images, and separates the second line images to generate a second separated image composed of the second line images. Next, the arithmetic processing apparatus 200 generates a difference image by determining the differences between the luminance values of the first separated image and second separated image. The arithmetic processing apparatus 200 then calculates an inclination of the surface of the strip-shaped body S based on the difference image, to thereby detect unevenness that is present at the surface of the strip-shaped body S.

For example, assume that, as illustrated in FIG. 2, the surface of the strip-shaped body S is in a horizontal state in which the surface is orthogonal to the optical axis of the line sensor camera 101. At this time, the luminance of reflection light at the surface of the strip-shaped body S of illumination light from the first illumination light source 103 (hereunder, also referred to as "first reflection luminance"), and the luminance of reflection light at the surface of the strip-shaped body S of illumination light from the second illumination light source 105 (hereunder, also referred to as "second reflection luminance") are equal. On the other hand, as illustrated in FIG. 3 and FIG. 4, in a case where there is unevenness (for example, a V-shaped depression) in the surface of the strip-shaped body S, the first reflection luminance and the second reflection luminance differ from each other. That is, as illustrated in FIG. 3, when illumination light is radiated onto a rightwardly descending sloped portion of the unevenness, the second reflection luminance is greater than the first reflection luminance. On the other hand, as illustrated in FIG. 4, when illumination light is radiated onto a rightwardly ascending sloped portion of the unevenness, the first reflection luminance is greater than the second reflection luminance.

Thus, although when the surface of the strip-shaped body S is level, the reflection luminances of the two illumination lights are the same and there is no difference therebetween, when there is unevenness in the surface of the strip-shaped body S, a difference arises between the reflection luminances of the two illumination lights. Accordingly, if a difference between the reflection luminances of the two illumination lights can be acquired, the surface shape of the strip-shaped body S can be acquired. Therefore, in the present embodiment, in order to acquire the surface shape of the strip-shaped body S, a difference between reflection luminances at the surface of the strip-shaped body S is acquired by determining a difference in luminance values between first line images that are acquired by the line sensor camera 101 when the first illumination light is being radiated from the first illumination light source 103 and second line images that are acquired by the line sensor camera 101 when the second illumination light is being radiated from the second illumination light source 105.

In the shape inspection apparatus 10 according to the present embodiment, it is possible to perform measurement processing with respect to the strip-shaped body S by the measurement apparatus 100 and processing to calculate an inclination in the surface of the strip-shaped body S by the arithmetic processing apparatus 200, in real time together with conveyance of the strip-shaped body S. By paying attention to detection results that are outputted from the shape inspection apparatus 10 (more specifically, the arithmetic processing apparatus 200), it is possible for a user of the shape inspection apparatus 10 to ascertain and inspect the surface shape of the strip-shaped body S in real time. Further, it is also possible to automatically determine the surface shape of the strip-shaped body S based on an inclination in the surface of the strip-shaped body S calculated by the shape inspection apparatus 10. Hereunder, the measurement apparatus 100 and the arithmetic processing apparatus 200 are each described in detail.

1-2. Configuration of Shape Inspection Apparatus (a) Measurement Apparatus

Figure 5:
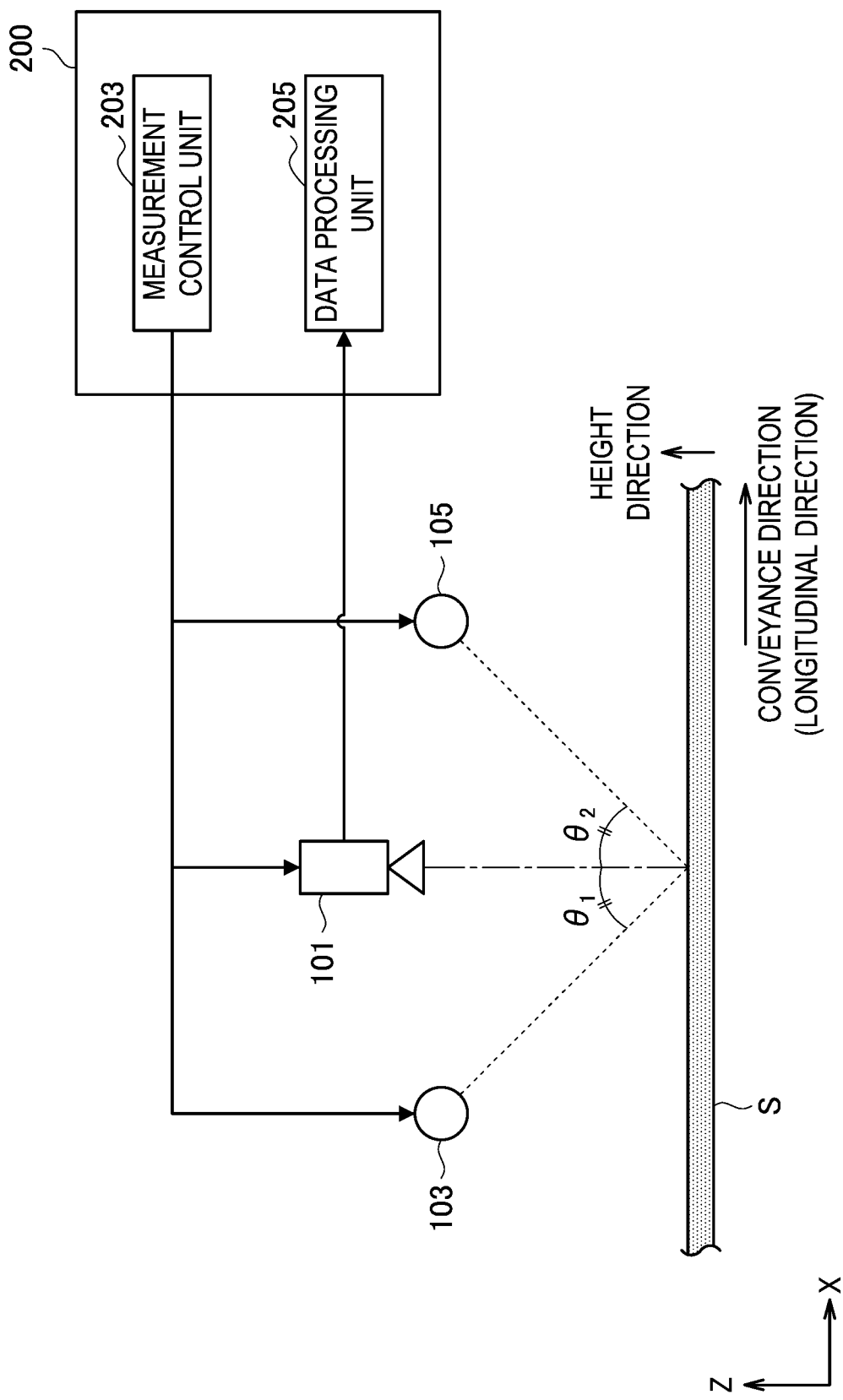
FIG. 5 is an explanatory diagram that schematically illustrates one configuration example of a measurement apparatus constituting part of the shape inspection apparatus according to the first embodiment, which illustrates a state when the strip-shaped body is viewed from a side face.
Figure 6:
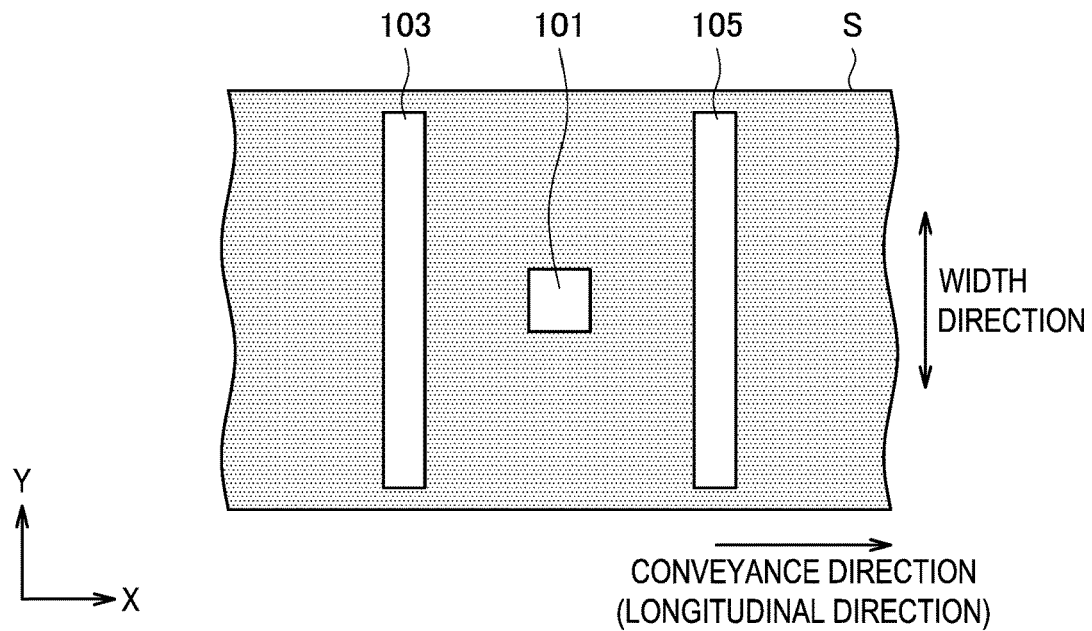
FIG. 6 is a plan view of FIG. 5.

First, the measurement apparatus 100 according to the present embodiment is described in detail referring to FIG. 5 and FIG. 6. FIG. 5 is an explanatory diagram that schematically illustrates one configuration example of the measurement apparatus 100 that constitutes part of the shape inspection apparatus 10 according to the present embodiment, and illustrates a state in which the strip-shaped body S is seen from a side face. FIG. 6 is a plan view of FIG. 5.

As illustrated in FIG. 5 and FIG. 6, the measurement apparatus 100 according to the present embodiment has the line sensor camera 101, the first illumination light source 103 and the second illumination light source 105. The line sensor camera 101, the first illumination light source 103 and the second illumination light source 105 are fixed by known means so that their setting positions do not change. The strip-shaped body S moves relative to the line sensor camera 101 and the respective illumination light sources 103 and 105. The line sensor camera 101 sequentially photographs the surface of the strip-shaped body S that moves in the conveyance direction (that is, the longitudinal direction of the strip-shaped body S).

At such time, regions of the strip-shaped body S corresponding to the respective line images acquired by the line sensor camera 101 do not overlap with each other. That is, the line sensor camera 101 photographs different regions of the strip-shaped body S at timings for acquiring line images that are adjacent, and the same regions of the strip-shaped body S are not photographed in an overlapping manner.

(Line Sensor Camera)

The line sensor camera 101 is a photographing apparatus that photographs images in one-dimensional line units. The line sensor camera 101 may be, for example, a monochrome line sensor camera, or may be a known color line sensor camera such as a camera that adopts the 3CCD system. In the case of using a color line sensor camera, it is also possible to ascertain the color of the surface of the strip-shaped body S to be inspected.

For example, as illustrated in FIG. 5, the line sensor camera 101 is arranged above (the positive direction side of the Z-axis) the strip-shaped body S in a manner so that the specular reflection direction of the optical axis thereof is perpendicular to the surface of the strip-shaped body S. At such time, an angle formed by the specular reflection direction of the optical axis of the line sensor camera 101 and the normal direction of the surface of the strip-shaped body S is 0°. Note that, the present invention is not limited to this example, and the line sensor camera 101 need not necessarily be arranged so that the specular reflection direction of the optical axis thereof is perpendicular to the surface of the strip-shaped body S, and may be arranged so as to photograph the surface of the strip-shaped body S from another angle.

Further, the line sensor camera 101 is arranged so that the longitudinal direction (Y-direction) of a line image acquired by the line sensor camera 101 is approximately orthogonal to the conveyance direction (X-direction) of the strip-shaped body S. Note that, the longitudinal direction of the line image and the conveyance direction of the strip-shaped body S need not be strictly orthogonal, and an inclination of around ±10° is acceptable.

The line sensor camera 101 photographs the surface of the strip-shaped body S at which the first illumination light of the first illumination light source 103 or the second illumination light of the second illumination light source 105 is being radiated. Based on control information from a measurement control unit 203 of the arithmetic processing apparatus 200, the measurement apparatus 100 according to the present embodiment causes the first illumination light source 103 and the second illumination light source 105 to emit light successively in an alternating manner, and photographs the surface of the strip-shaped body S by means of the line sensor camera 101 within a light emission time period from the respective lighting timings. Accordingly, the line sensor camera 101 alternately acquires a line image that is photographed when the first illumination light source 103 is radiating light (first line image) and a line image that is photographed when the second illumination light source 105 is radiating light (second line image).

The line sensor camera 101 outputs the line images acquired by photographing the surface of the strip-shaped body S to the arithmetic processing apparatus 200. At the arithmetic processing apparatus 200 that receives the line images as input, a data processing unit 205 performs processing for calculating an inclination of the surface of the strip-shaped body S.

(Illumination Light Source)

The measurement apparatus 100 according to the present embodiment includes two illumination light sources, namely, the first illumination light source 103 and the second illumination light source 105. The first illumination light source 103 radiates a first illumination light at the surface of the strip-shaped body S, and the second illumination light source 105 radiates a second illumination light at the surface of the strip-shaped body S. In the present embodiment it is desirable to make the first illumination light of the first illumination light source 103 and the second illumination light of the second illumination light source 105 the same color. For example, when the first illumination light of the first illumination light source 103 is white light, the second illumination light of the second illumination light source 105 is also made white light. The colors of the first illumination light and the second illumination light are not particularly limited, and it suffices to decide the color depending on the object to be inspected. Further, the first illumination light and the second illumination light need not to be visible light, and may be infrared light or ultraviolet light. That is, as the first illumination light source 103 and the second illumination light source 105, it is good to use light sources for which radiation conditions such as wavelength, output intensity, and type of light source are substantially the same.

As illustrated in FIG. 6, the first illumination light source 103 and the second illumination light source 105 are, for example, configured so as to radiate illumination light across almost the entire area in the width direction of the strip-shaped body S. Any light source can be utilized as the first illumination light source 103 and the second illumination light source 105 as long as it is possible to radiate illumination light in this manner. For example, the first illumination light source 103 and the second illumination light source 105 may be a rod-like LED light, or may be a light having a configuration in which a laser beam is expanded by a rod lens or the like into a linear shape. Further, as a visible-light source utilized as the first illumination light source 103 and the second illumination light source 105, a light source that uses a single-wavelength laser beam or an LED may be used, or a light source with a continuous spectrum may be used.

Further, as illustrated in FIG. 5, the first illumination light source 103 and the second illumination light source 105 are each arranged so as to be symmetric with respect to the specular reflection direction at the surface of the strip-shaped body S of the optical axis of the line sensor camera 101. In the example illustrated in FIG. 5, because the line sensor camera 101 is arranged so that the specular reflection direction of the optical axis is perpendicular to the surface of the strip-shaped body S, the optical axis of the line sensor camera 101 and the specular reflection direction at the surface of the strip-shaped body S of the optical axis in question are identical. Therefore, the first illumination light source 103 and the second illumination light source 105 are arranged so that an angle (first angle: $\theta_1$) formed by the optical axis of the first illumination light source 103 and the optical axis of the line sensor camera 101, and an angle (second angle: $\theta_2$) formed by the optical axis of the second illumination light source 105 and the optical axis of the line sensor camera 101 are substantially equal to each other.

Note that, the term "the first angle $\theta_1$ and the second angle $\theta_2$ are substantially equal to each other" includes not only a case where the first angle $\theta_1$ and the second angle $\theta_2$ are identical, but also a case where the first angle $\theta_1$ and the second angle $\theta_2$ have an angle difference within a range such that, when a flat surface without unevenness is irradiated with illumination light from the first illumination light source 103 or the second illumination light source 105 and the surface of the strip-shaped body S is photographed by the line sensor camera 101, the flat surface without unevenness appears the same with respect to the illumination light from both the first illumination light source 103 and the second illumination light source 105, taking into account changes in luminance due to dirt or the like that is present on the flat surface. This angle difference $|\theta_1-\theta_2|$ between the first angle $\theta_1$ and the second angle $\theta_2$ is, for example, preferably 10° or less, and more preferably is 5° or less. With the angle difference within such a range, when a flat surface without unevenness is irradiated with illumination light from the respective illumination light sources 103 and 105 and photographed by the line sensor camera 101, the two photographed images will appear the same.

Further, the size of the first angle $\theta_1$ and the size of the second angle $\theta_2$ are both preferably as large as possible within a range in which there is no constraint on light source installation. By this means, irregular reflection of the respective illumination light beams can be measured by the line sensor camera 101. For example, the size of the first angle $\theta_1$ and the size of the second angle $\theta_2$ are both preferably 30° or more. By making the size of the first angle $\theta_1$ and the size of the second angle $\theta_2$ not less than 30°, respectively, it is possible to further increase a relative change in a luminance value with respect to an angle change that is measured by the line sensor camera 101.

The first illumination light source 103 and the second illumination light source 105 are caused to emit light alternately based on control information from the measurement control unit 203 of the arithmetic processing apparatus 200. Within the respective light emission time periods of the first illumination light source 103 and the second illumination light source 105, the line sensor camera 101 photographs the surface of the strip-shaped body S and acquires a line image.

The foregoing is a description of the configuration of the measurement apparatus 100 according to the present embodiment. Although in FIG. 5 and FIG. 6 an example is illustrated in which the first illumination light source 103 is arranged on the upstream side in the conveyance direction and the second illumination light source 105 is arranged on the downstream side in the conveyance direction, the present invention is not limited to this example. For example, the second illumination light source 105 may be arranged on the upstream side in the conveyance direction and the first illumination light source 103 may be arranged on the downstream side.

(b) Arithmetic Processing Apparatus

Figure 7:
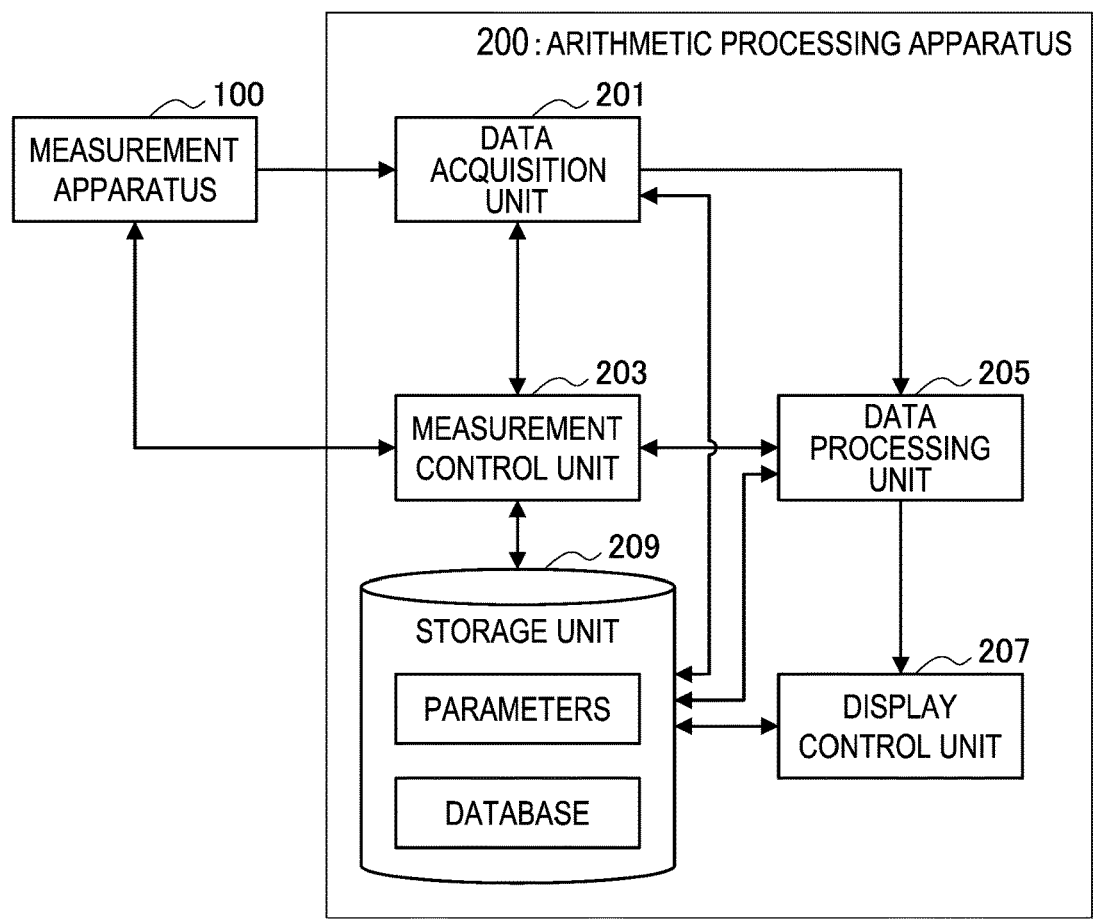
FIG. 7 is a block diagram illustrating one example of the overall configuration of an arithmetic processing apparatus according to the first embodiment.
Figure 8:
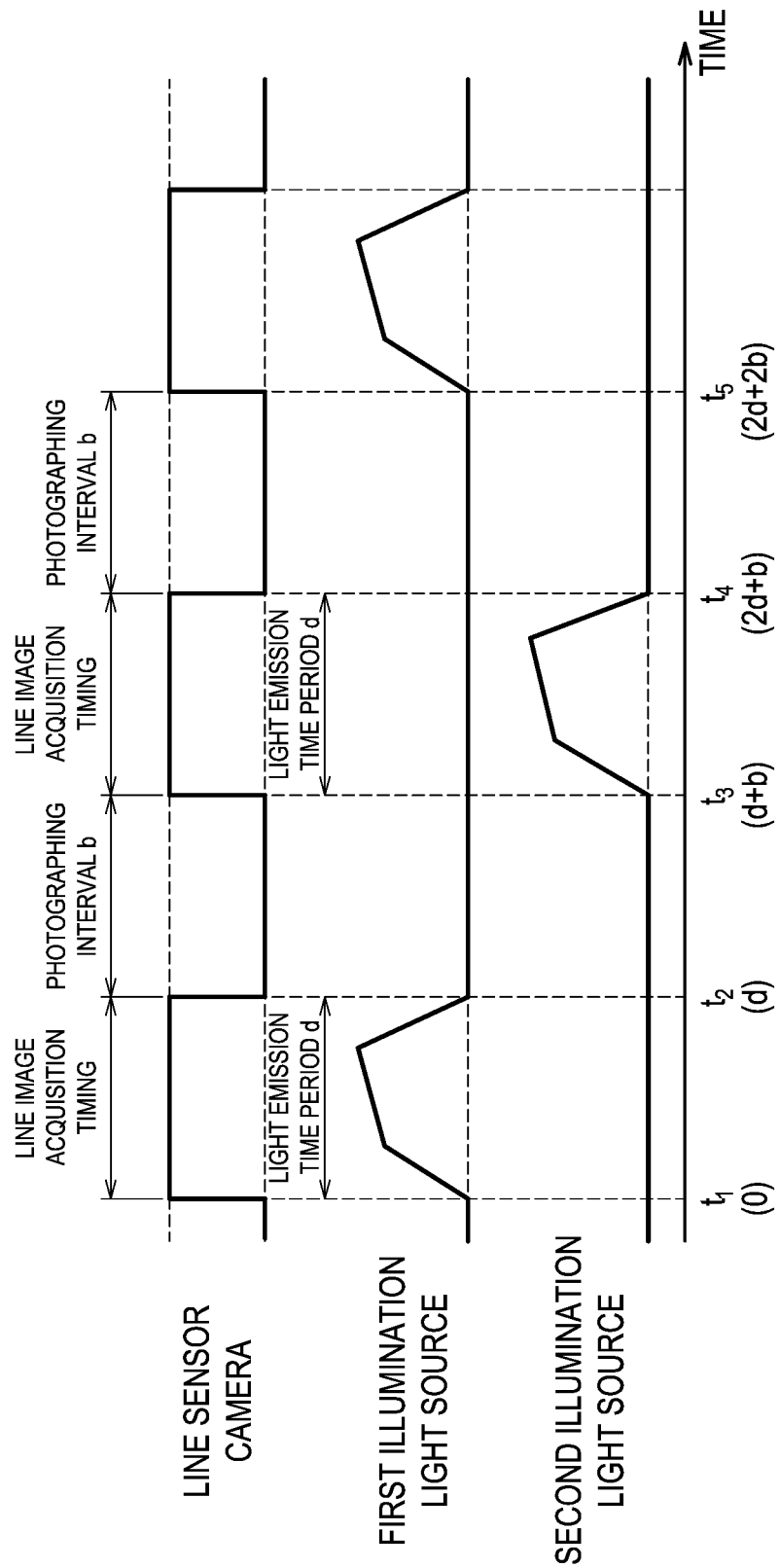
FIG. 8 is a diagram illustrating one example of a line image acquisition timing of a line sensor camera, a lighting timing and a light emission time period of a first illumination light source, and a lighting timing and a light emission time period of a second illumination light source.
Figure 9:
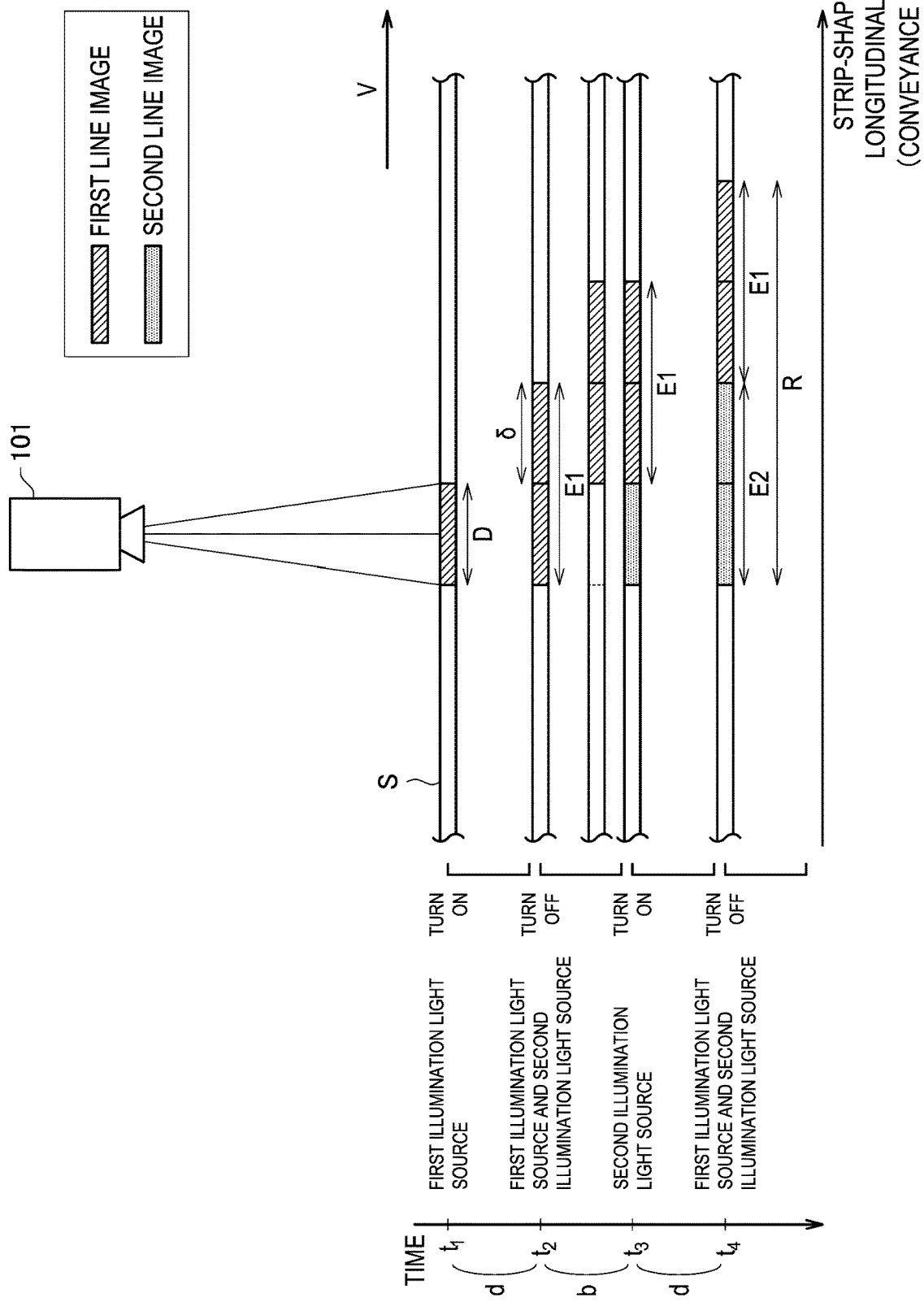
FIG. 9 is an explanatory diagram illustrating a photographing range of a line image that is acquired by a line sensor camera when the line image acquisition timing, lighting timings and light emission time periods shown in FIG. 8 were set.
Figure 10:
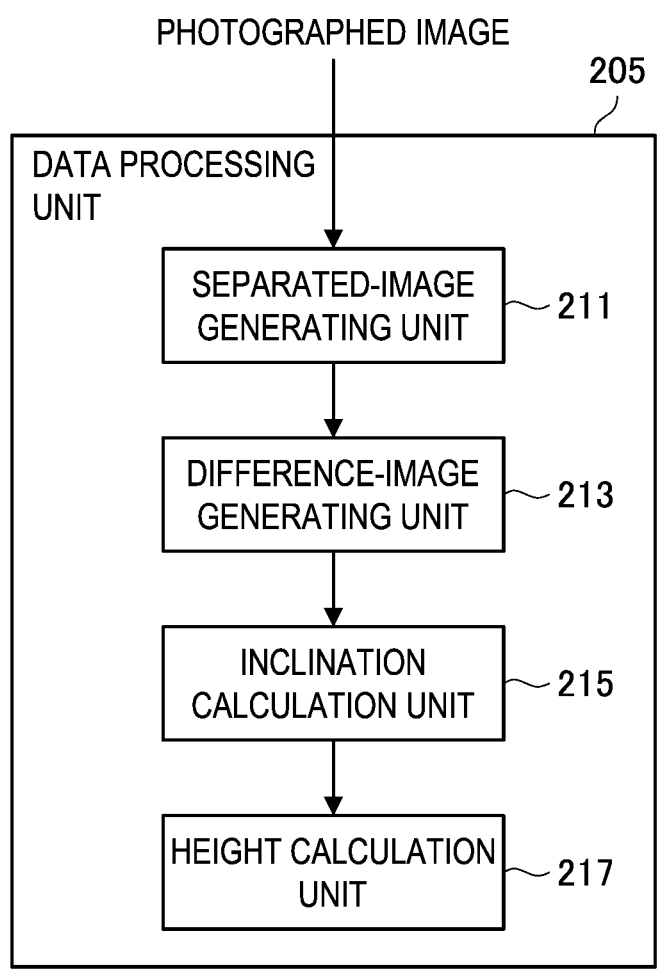
FIG. 10 is a block diagram illustrating one example of the configuration of a data processing unit according to the first embodiment.
Figure 11:
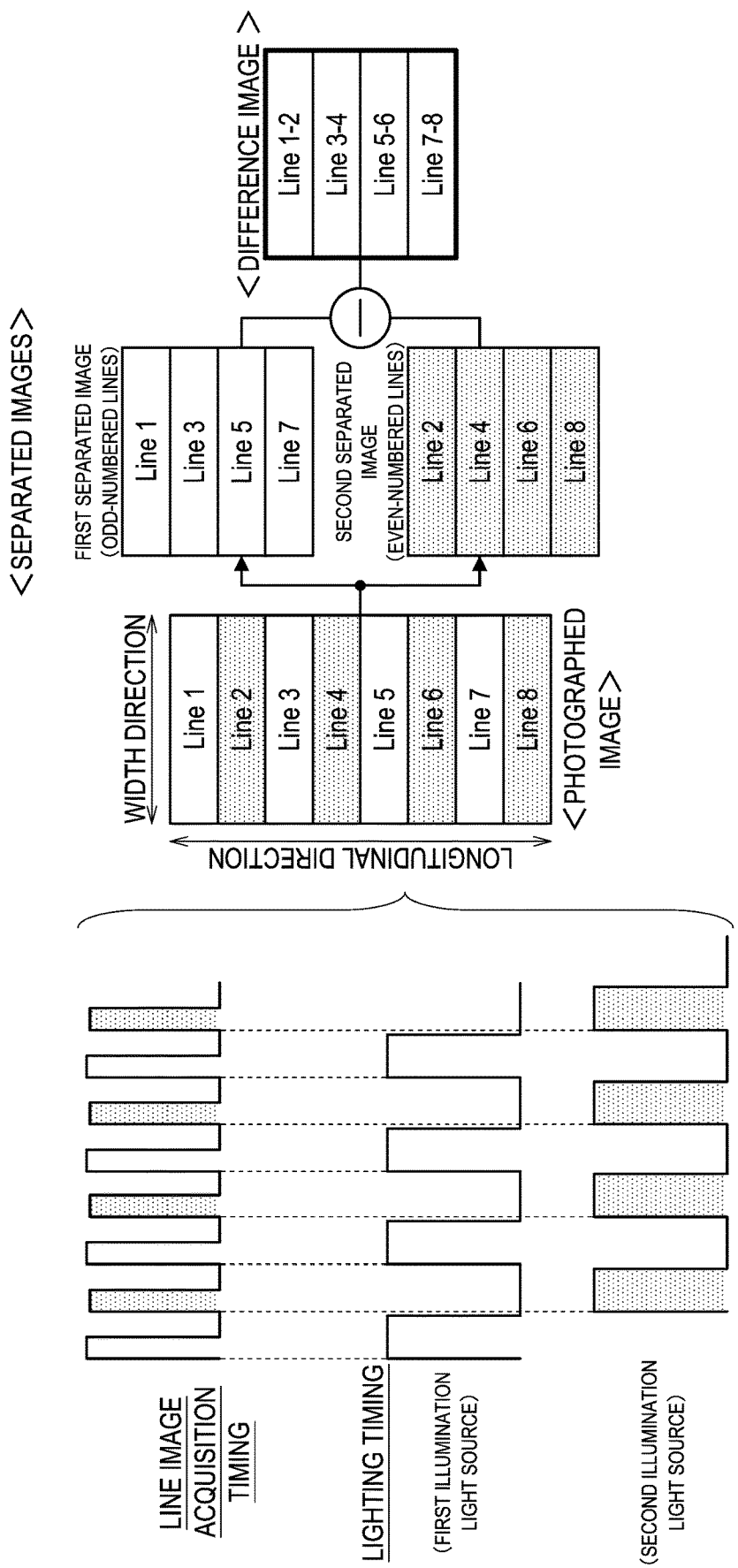
FIG. 11 is an explanatory diagram for describing difference image generation processing performed by a data processing unit according to the first embodiment.
Figure 12:
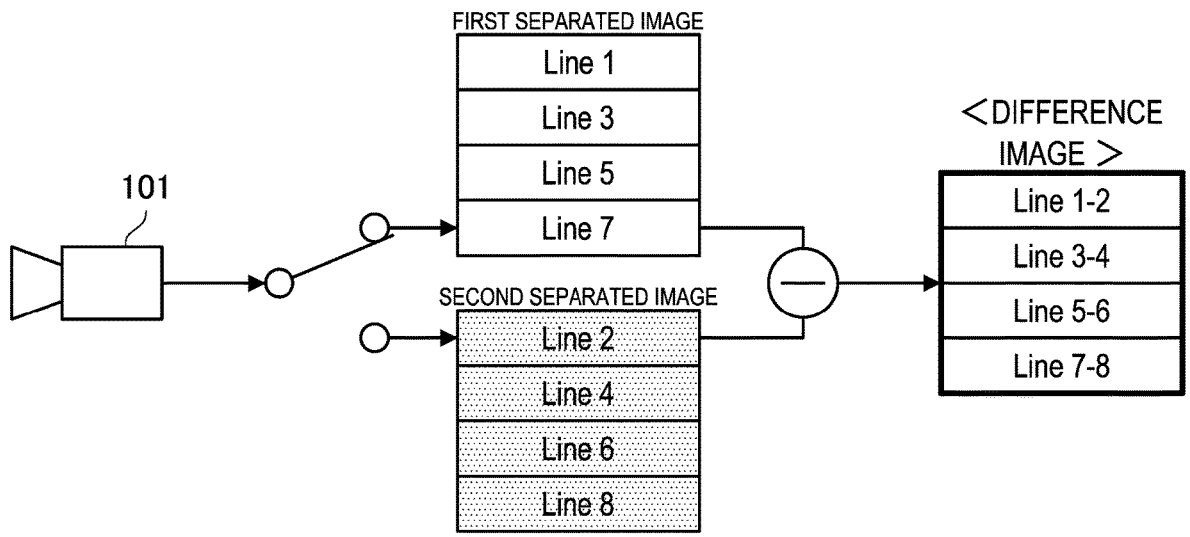
FIG. 12 is an explanatory diagram illustrating one modification of the difference image generation processing performed by the data processing unit according to the first embodiment.
Figure 13:
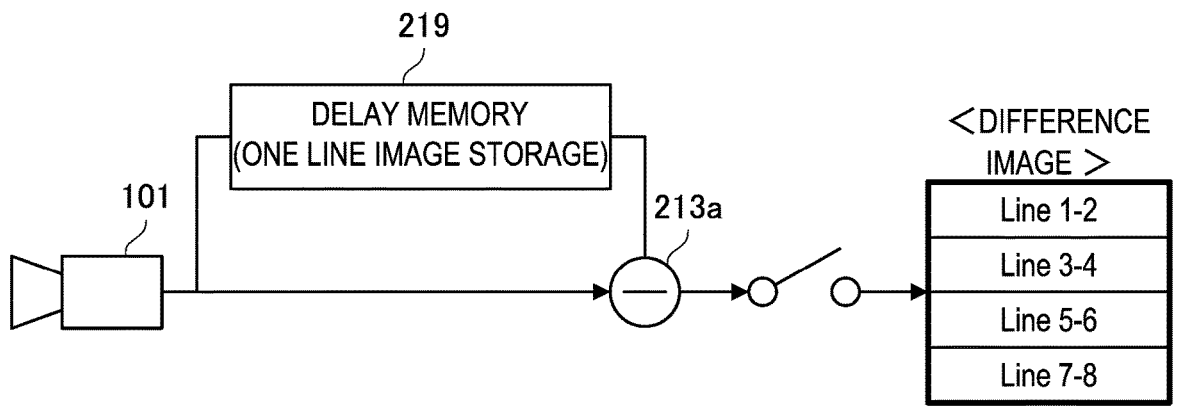
FIG. 13 is an explanatory diagram illustrating another modification of the difference image generation processing performed by the data processing unit according to the first embodiment.
Figure 14:
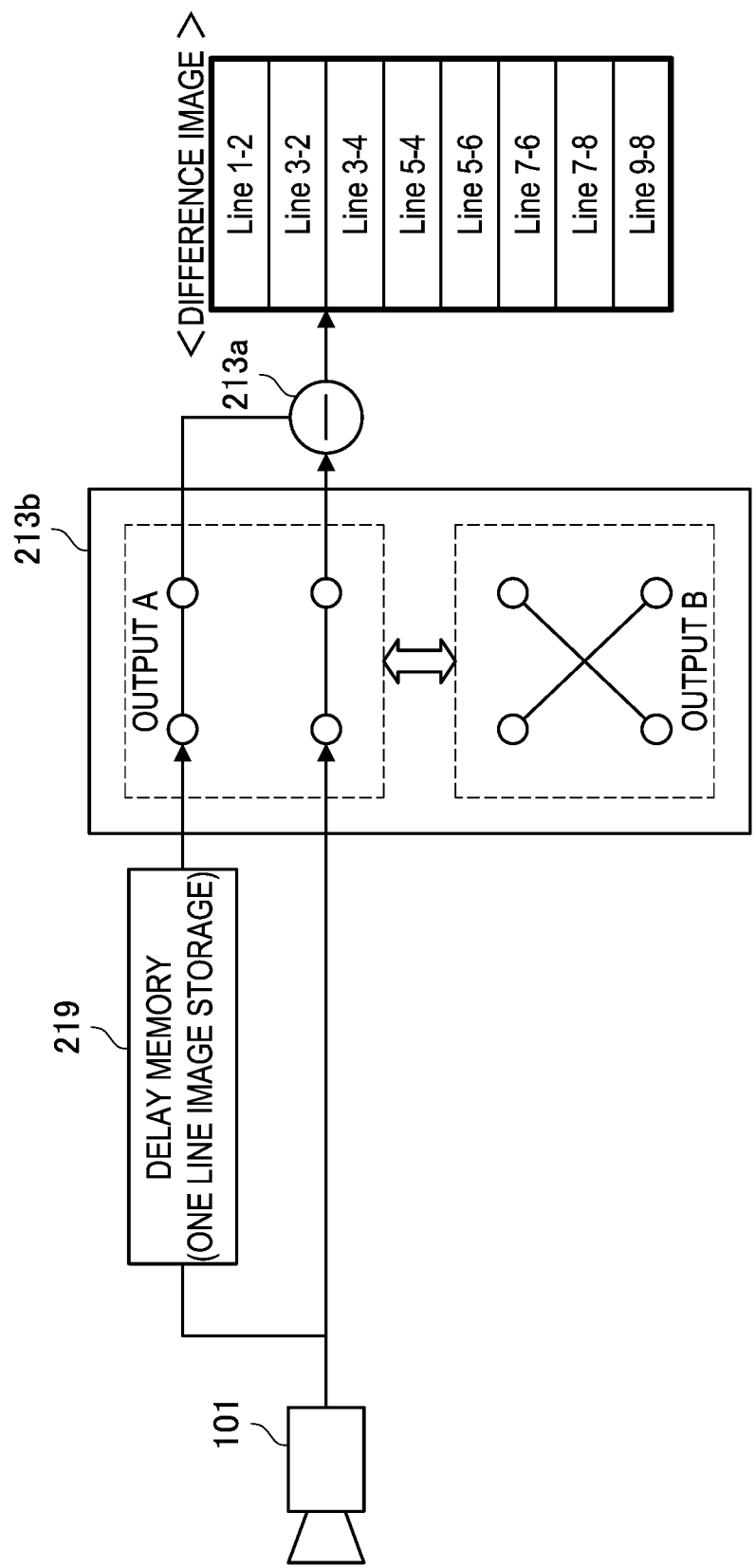
FIG. 14 is an explanatory diagram illustrating another modification of the difference image generation processing performed by the data processing unit according to the first embodiment.
Figure 15:
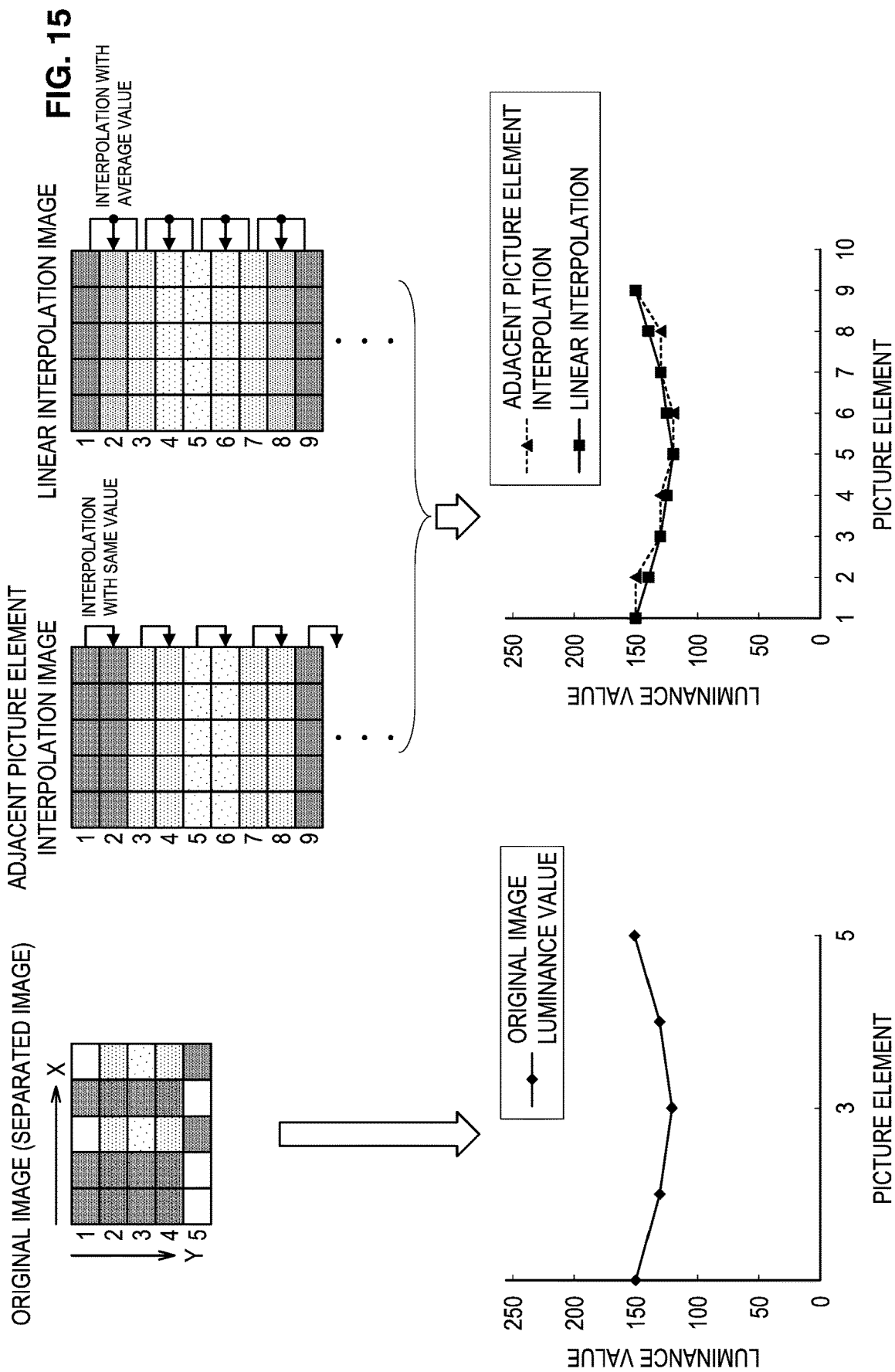
FIG. 15 is an explanatory diagram illustrating a conceptual image of luminance changes in an image as a result of interpolation processing.
Figure 16:
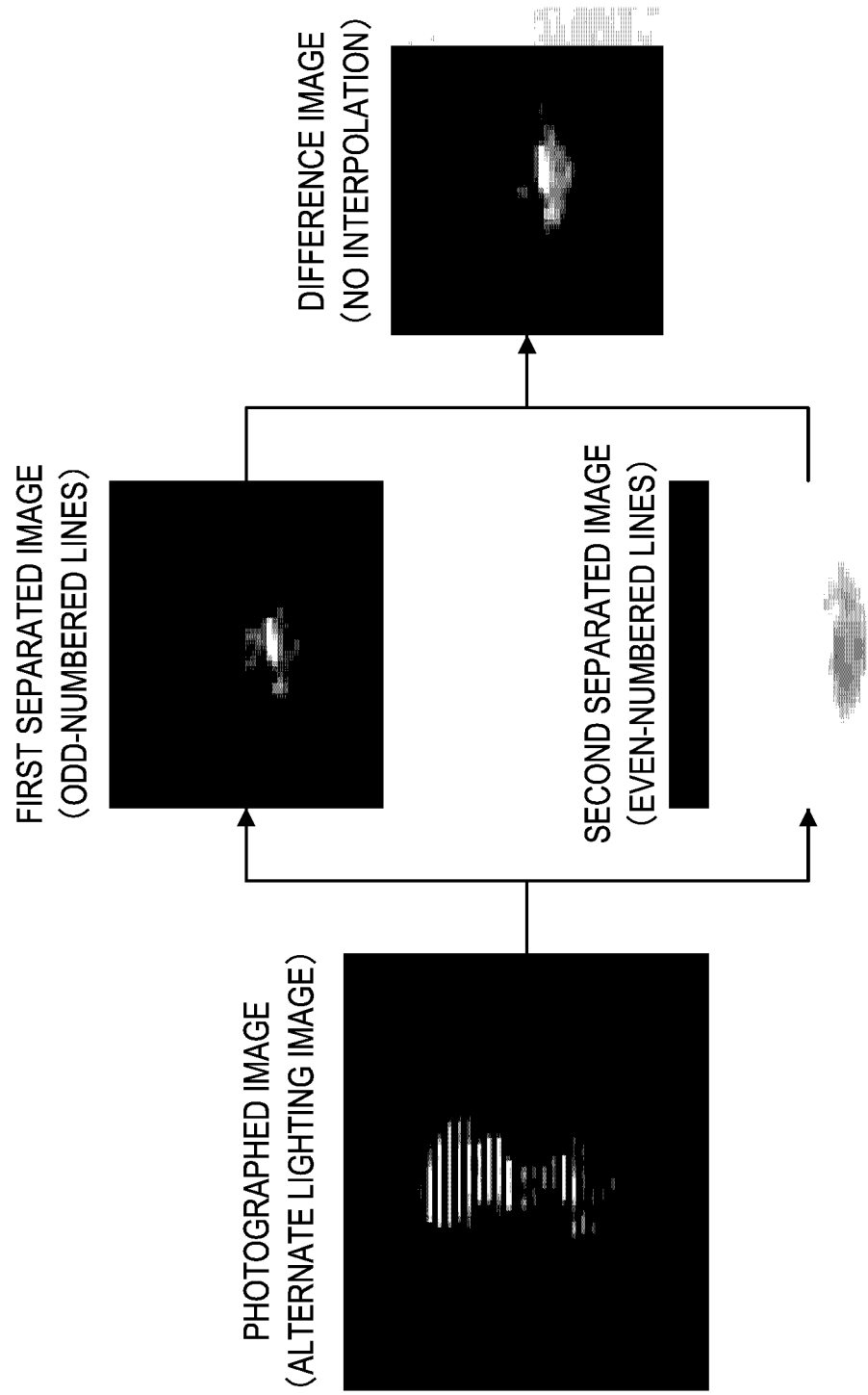
FIG. 16 is an explanatory diagram illustrating an example of images generated based on the difference image generation processing illustrated in FIG. 11.
Figure 17:
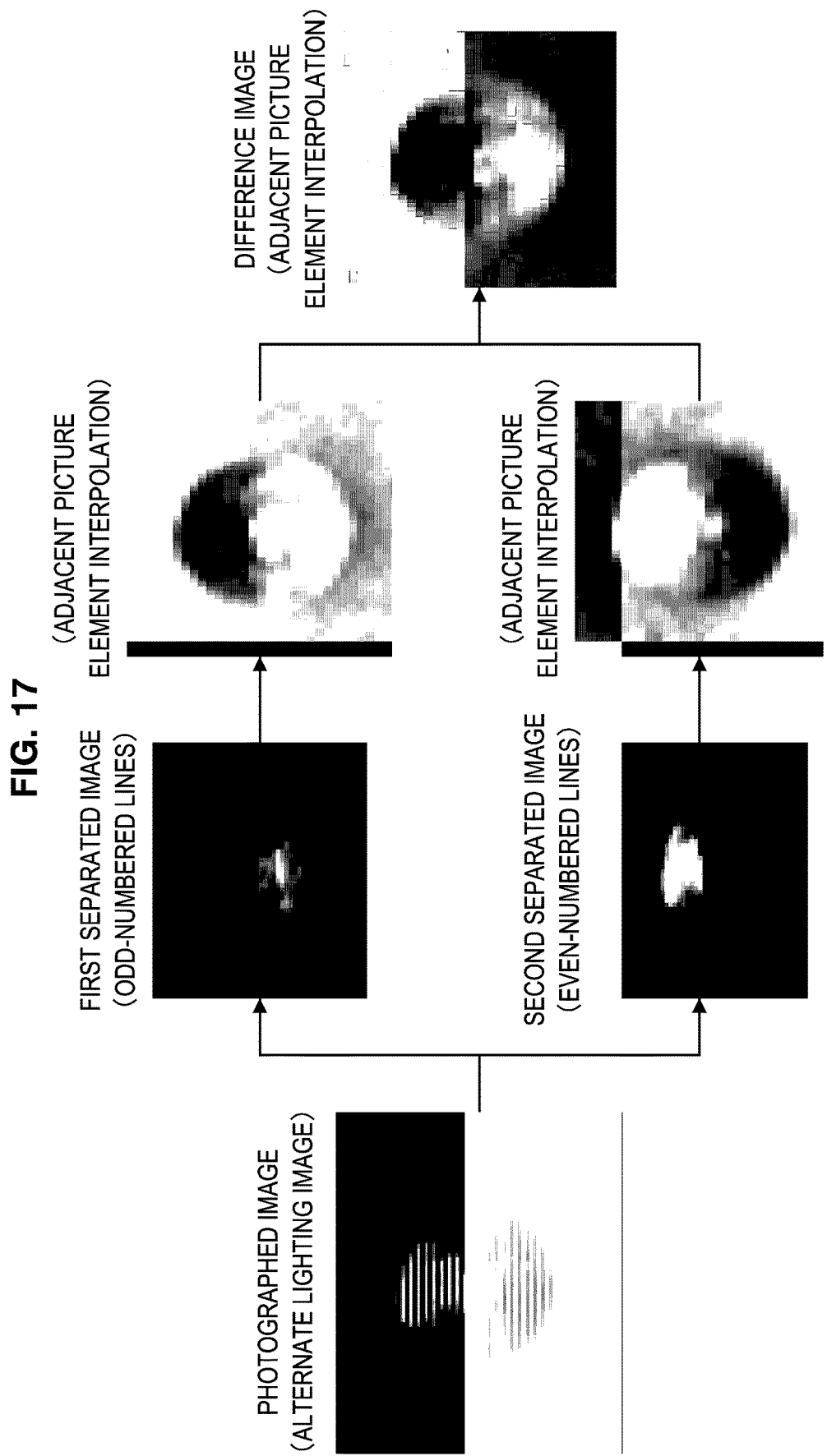
FIG. 17 is an explanatory diagram illustrating an example of images in a case where adjacent picture element interpolation processing was performed on separated images illustrated in FIG. 16 to generate a difference image.
Figure 18:
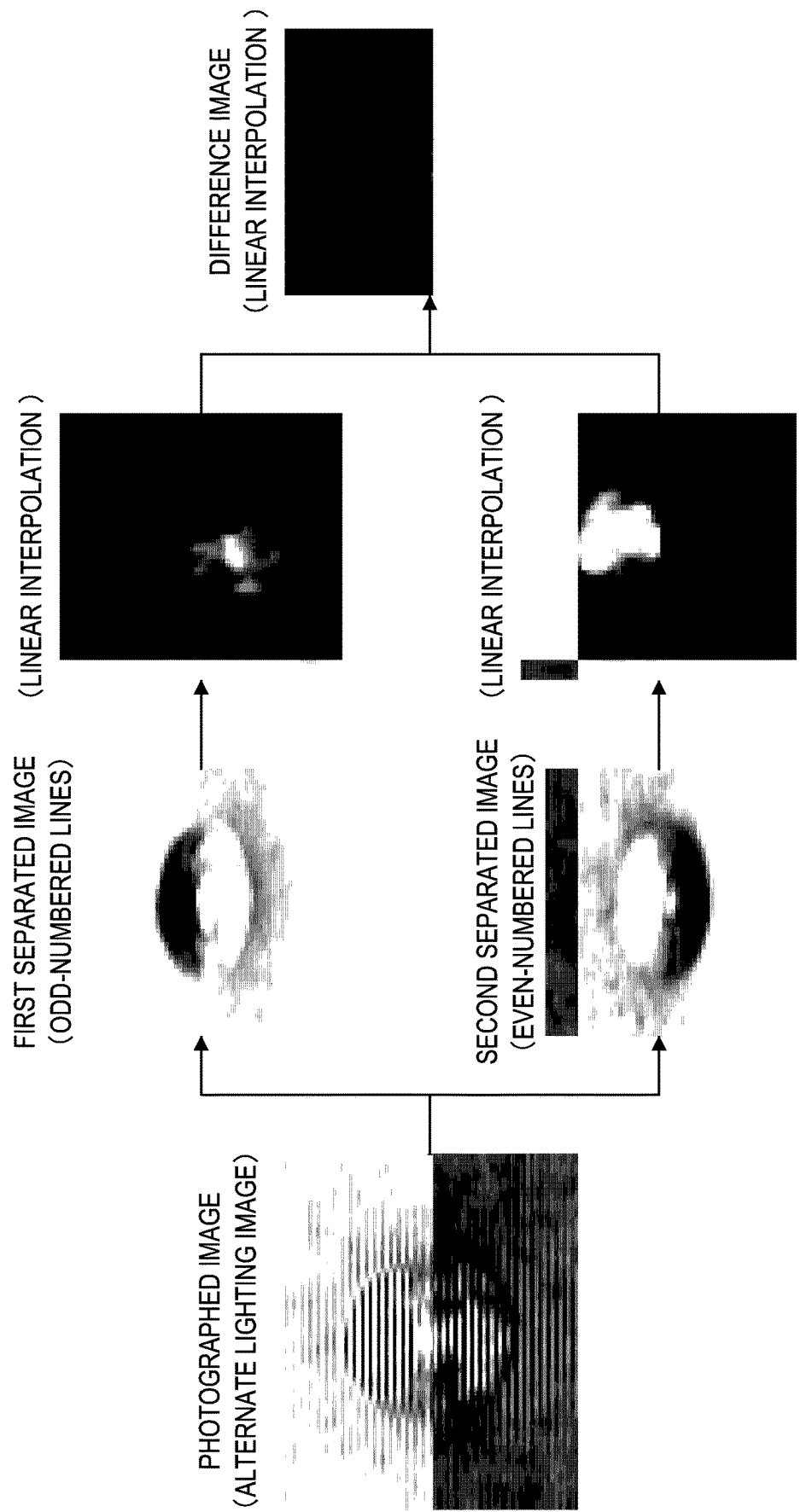
FIG. 18 is an explanatory diagram illustrating an example of images in a case where linear interpolation processing was performed on separated images illustrated in FIG. 16 to generate a difference image.
Figure 19:
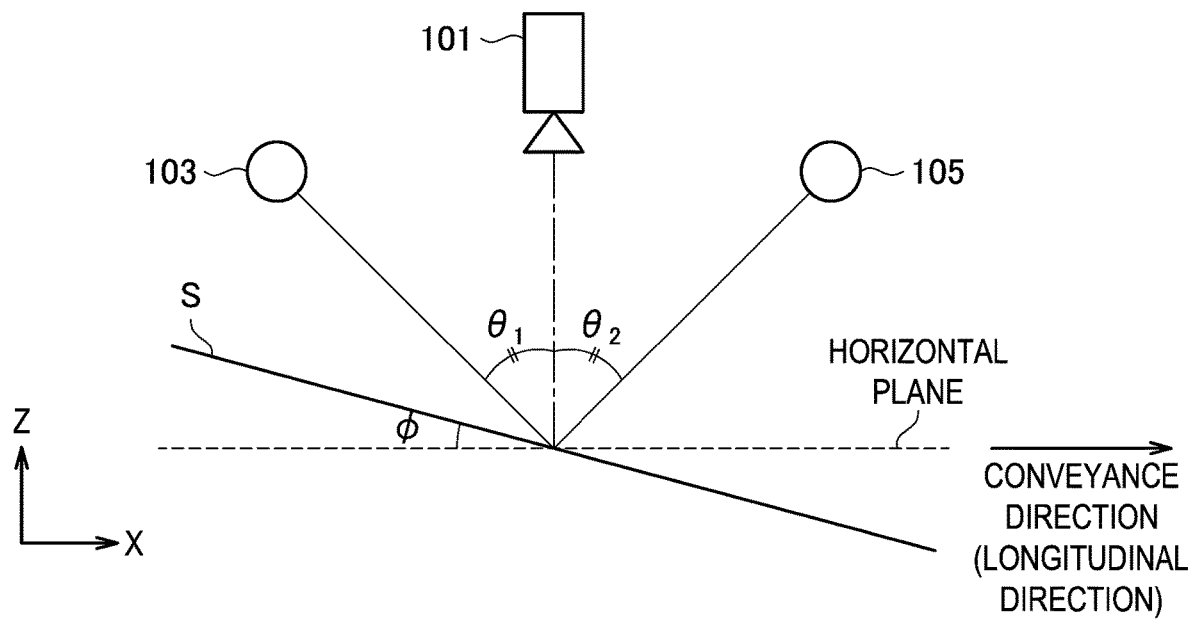
FIG. 19 is an explanatory diagram that schematically illustrates the relation between the angle of reflection of illumination light and the inclination angle of a surface in a measurement apparatus according to the first embodiment.
Figure 20:
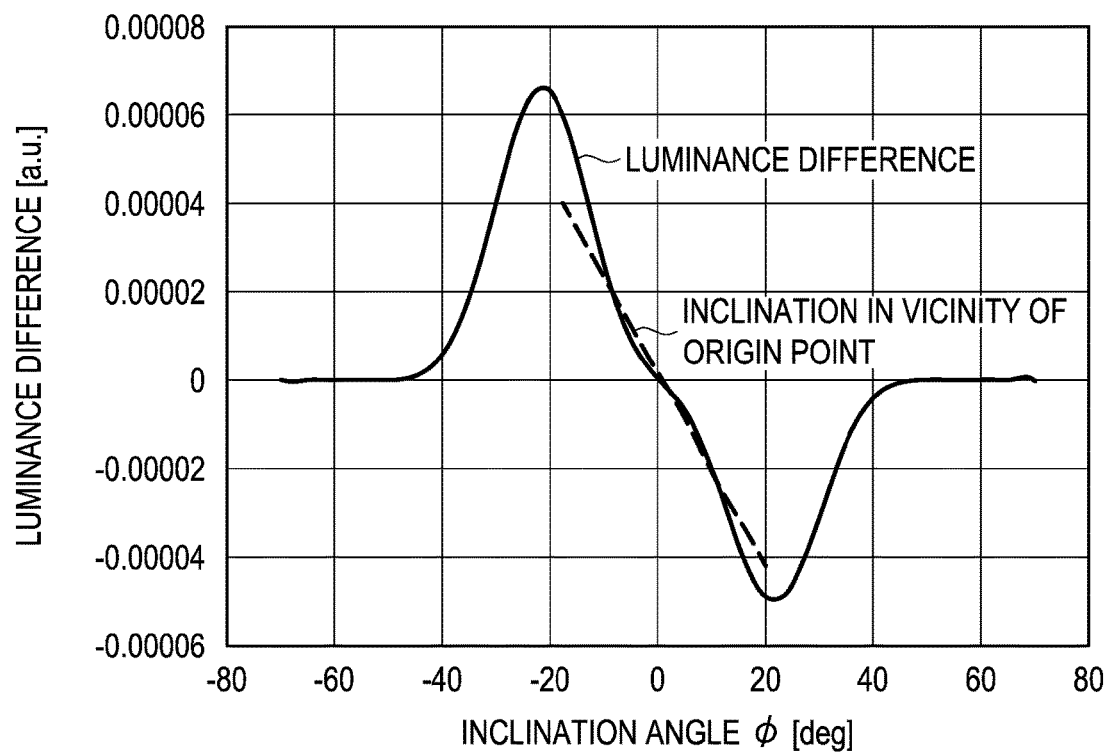
FIG. 20 is a graph illustrating an example of the positional relation between inclination of a surface of a strip-shaped body and luminance difference.

Next, the configuration of the arithmetic processing apparatus 200 that is included in the shape inspection apparatus 10 according to the present embodiment will be described in detail based on FIG. 7 to FIG. 20. FIG. 7 is a block diagram illustrating one example of the overall configuration of the arithmetic processing apparatus 200 according to the present embodiment. FIG. 8 is a diagram illustrating one example of the line image acquisition timing of the line sensor camera 101, the lighting timing and light emission time period of the first illumination light source 103, and the lighting timing and light emission time period of the second illumination light source 105. FIG. 9 is an explanatory diagram illustrating a photographing range of a line image that is acquired by the line sensor camera 101 when the line image acquisition timing, lighting timings and light emission time periods shown in FIG. 8 were set. FIG. 10 is a block diagram illustrating one example of the configuration of the data processing unit 205 according to the present embodiment. FIG. 11 is an explanatory diagram for describing difference image generation processing performed by the data processing unit 205 according to the present embodiment. FIG. 12 to FIG. 14 are explanatory diagrams illustrating modifications of the difference image generation processing performed by the data processing unit 205 according to the present embodiment. FIG. 15 is an explanatory diagram illustrating a conceptual image of luminance changes in an image as a result of interpolation processing. FIG. 16 is an explanatory diagram illustrating an example of images generated based on the difference image generation processing illustrated in FIG. 11. FIG. 17 is an explanatory diagram illustrating an example of images in a case where adjacent picture element interpolation processing was performed on separated images illustrated in FIG. 16 to generate a difference image. FIG. 18 is an explanatory diagram illustrating an example of images in a case where linear interpolation processing was performed on separated images illustrated in FIG. 16 to generate a difference image. FIG. 19 is an explanatory diagram that schematically illustrates the relation between an angle of reflection of illumination light and an inclination angle of a surface in the measurement apparatus 100 according to the present embodiment. FIG. 20 is a graph illustrating an example of the positional relation between an inclination of a surface of a strip-shaped body and luminance difference.

Note that, the term "lighting timing" refers to a time point at which an illumination light source lights up (that is, a time point at which the light source starts to emit light), and the term "light emission time period" refers to a time period from when the illumination light source lights up until the light source turns off. Further, the term "line image acquisition timing" refers to a time at which the state is one in which an illumination light source is emitting light and an image sensor of the line sensor camera 101 is exposed. At a timing at which an illumination light source is emitting light but an image sensor is not exposed, or a timing at which an image sensor is exposed but an illumination light source is not emitting light, information for an image cannot be acquired. Such timings are not included in the meaning of the term "line image acquisition timing".

The arithmetic processing apparatus 200 according to the present embodiment is an apparatus that calculates an inclination of the surface of the strip-shaped body S in order to detect the surface shape of the strip-shaped body S, based on a photographed image acquired by the measurement apparatus 100. As illustrated in FIG. 7, the arithmetic processing apparatus 200 mainly includes a data acquisition unit 201, the measurement control unit 203, the data processing unit 205, a display control unit 207 and a storage unit 209.

(Data Acquisition Unit)

The data acquisition unit 201 is realized by, for example, a central processing unit (CPU), a read only memory (ROM), a random access memory (RAM), a communication device, and the like. The data acquisition unit 201 acquires a photographed image photographed by the line sensor camera 101 of the measurement apparatus 100, and transmits the photographed image to the data processing unit 205 that is described later. Further, the data acquisition unit 201 may store the acquired photographed image in association with time information relating to the date and time at which the photographed image was photographed in the storage unit 209, described later, as history information.

(Measurement Control Unit)

The measurement control unit 203 is realized by a CPU, a ROM, a RAM, a communication device and the like. The measurement control unit 203 controls measurement of the strip-shaped body S by the measurement apparatus 100 according to the present embodiment. More specifically, when starting measurement of the strip-shaped body S, the measurement control unit 203 sends controls signals to the first illumination light source 103 and the second illumination light source 105 to cause the first illumination light source 103 and the second illumination light source 105 to radiate illumination light.

Further, when the first illumination light source 103 and the second illumination light source 105 each start to radiate the surface of the strip-shaped body S with illumination light, the measurement control unit 203 sends a trigger signal for starting measurement to the line sensor camera 101, based on a PLG signal that is sent at regular intervals from a driving mechanism or the like for changing a relative position between the strip-shaped body S and the measurement apparatus 100 (for example, a PLG signal that is output each time the strip-shaped body S moves 1 mm). By this means, it is possible for the measurement apparatus 100 to acquire measurement data (a line image) at each position of the strip-shaped body S in the conveyance direction.

Based on a line speed that is the relative speed between the strip-shaped body S and the line sensor camera 101, the measurement control unit 203 according to the present embodiment controls the first illumination light source 103 and the second illumination light source 105 so that the first illumination light source 103 and the second illumination light source 105 sequentially radiate illumination light in an alternating manner. Further, the measurement control unit 203 controls a line image acquisition timing of the line sensor camera 101 based on the line speed so that the surface of the strip-shaped body S is photographed by the line sensor camera 101 within light emission time periods in which the first illumination light source 103 and the second illumination light source 105 radiate an illumination light, respectively.

For example, assume that the line image acquisition timing of the line sensor camera 101, the lighting timing and light emission time period of the first illumination light source 103, and the lighting timing and light emission time period of the second illumination light source 105 are set as illustrated in FIG. 8. At such time, as illustrated in FIG. 9, let "D" represent a length in the conveyance direction of the strip-shaped body S per picture element of the line sensor camera 101 on the strip-shaped body S (hereunder, referred to as "picture element length"), and let "V" represent the line speed that is the relative speed between the strip-shaped body S and the line sensor camera 101. Further, as illustrated in FIG. 8, a time period from a time point that the previous photographing by the line sensor camera 101 ends until the next photographing starts is set as a photographing interval b. The photographing interval b is a time period in which photographing by the line sensor camera 101 is not performed.

At the moment at which the first illumination light source 103 lights up at a time t1, the range of the picture element length D of the strip-shaped body S enters the photographing range of the line sensor camera 101. Thereafter, the first illumination light source 103 continues to emit light until a time t2 (the duration of a light emission time period d), and during this period the strip-shaped body S moves by the amount of a distance δ (=Vd) at the line speed V. Accordingly, a first line image E1 acquired by the line sensor camera 101 is an image of a photographing range D+δ.

Subsequently, until immediately before a time t3, an image is not acquired by the line sensor camera 101, and the strip-shaped body S moves at the line speed V. Then, at the time point when the time t3 is reached, the second illumination light source 105 lights up and, similarly to the time when the first illumination light source 103 lights up, a photographing range E2 is acquired as a second line image by the line sensor camera 101 until a time t4.

On the strip-shaped body S, as long as the product (Vb) of the photographing interval b and the line speed V is not less than the picture element length D, that is, as long as Formula (1) below is satisfied, at the time that acquisition of the second line image starts, the first line image E1 is outside the photographing range (range of the picture element length D) of the line sensor camera 101. Therefore, the first line image and the second line image do not overlap. Accordingly, if the photographing interval b is repeatedly provided between a time of first line image acquisition and a time of second line image acquisition, there is no overlapping of the photographing range between a first line image and a second line image. Note that, it is not necessary for the surface of the strip-shaped body S to be photographed without any gaps by the line sensor camera 101, and a region of the strip-shaped body S that has not been photographed may exist between line images acquired at adjacent line image acquisition timings.

$$b \geq D/V \quad (1)$$

Note that, as described later, one differential line image is obtained from the first line image and the second line image. Accordingly, as illustrated in FIG. 9, it is necessary to make the photographing range E1 at the time of radiation of the first illumination light and the photographing range E2 at the time of radiation of the second illumination light during movement of the strip-shaped body S equal to or less than one-half of a resolution R that is necessary for recognizing the target shape. In a case where the photographing range E1 and the photographing range E2 are equal (E1=E2=E), a displacement amount δ that is caused by conveyance of the strip-shaped body S is the product (Vd) of the light emission time period d and the line speed V. Accordingly, it suffices to set the light emission time period d based on the following Formula (2).

$$d=(E-D)/V \quad (2)$$

Further, in order to increase the resolution of shape detection (that is, to decrease R=2×E), it suffices to shorten the light emission time period d of the first illumination light source and the second illumination light source, or to reduce the picture element length D on the strip-shaped body S.

(Data Processing Unit)

The data processing unit 205 is realized by, for example, a CPU, a ROM, a RAM, and a communication device or the like. The data processing unit 205 processes line images acquired by the measurement apparatus 100, and calculates an inclination of the surface of the strip-shaped body S. As illustrated in FIG. 10, the data processing unit 205 according to the present embodiment includes, for example, a separated-image generating unit 211, a difference-image generating unit 213, an inclination calculation unit 215 and a height calculation unit 217.

The separated-image generating unit 211 is realized by, for example, a CPU, a ROM, a RAM and the like, and based on a photographed image, generates a first separated image composed of line images (first line images) acquired at lighting timings of the first illumination light source 103, and a second separated image composed of line images (second line images) acquired at lighting timings of the second illumination light source 105. In the present embodiment, as illustrated in FIG. 11, a photographed image is an image generated by arranging in photographing order the line images acquired by the line sensor camera 101 within the respective light emission time periods of the first illumination light source 103 and the second illumination light source 105 alternately caused to emit light. For example, assume that line images of odd-numbered lines 1, 3, 5 and 7 are photographed within light emission time periods of the first illumination light source 103, and line images of even-numbered lines 2, 4, 6 and 8 are photographed within light emission time periods of the second illumination light source 105. At such time, as illustrated in FIG. 11, the photographed image is an image in which line images of odd-numbered lines and line images of even-numbered lines are alternately arranged along the longitudinal direction.

The separated-image generating unit 211 separates this kind of photographed image into line images of odd-numbered lines acquired while the first illumination light source 103 is emitting light, and line images of even-numbered lines acquired while the second illumination light source 105 is emitting light. The line images separated into two groups are arranged in photographing order, respectively, by the separated-image generating unit 211 to thereby generate two separated images. For example, a separated image composed of line images of odd-numbered lines will be taken as a first separated image, and a separated image composed of line images of even-numbered lines will be taken as a second separated image. Accordingly, the first separated image is composed of line images acquired while the first illumination light source 103 is emitting light, and the second separated image is composed of line images acquired while the second illumination light source 105 is emitting light.

Upon generating the first separated image and the second separated image, the separated-image generating unit 211 outputs the first separated image and the second separated image to the difference-image generating unit 213.

The difference-image generating unit 213 is realized by, for example, a CPU, a ROM, a RAM and the like, and generates a difference image between the first separated image and the second separated image. The difference image can also be said to be an image generated by arranging, in photographing order, single differential line images acquired based on first line images and second line images. For example, when a first separated image and a second separated image are generated as illustrated in FIG. 11, the difference-image generating unit 213 calculates the differences between luminance values of picture elements corresponding to the first separated image and second separated image, and generates a difference image that is represented by the differences between the luminance values. Portions at which luminance values differ between the first separated image and second separated image appear in the difference image. The difference-image generating unit 213 outputs the generated difference image to the inclination calculation unit 215.

Note that, in the processing to generate a difference image, a photographed image and separated images (first separated image and second separated image) as illustrated in FIG. 11 need not necessarily be generated.

For example, as illustrated in FIG. 12, even if a photographed image in which line images acquired by the line sensor camera 101 are arranged in photographing order is not generated, the separated-image generating unit 211 can generate separated images. In this case, each time the line sensor camera 101 acquires a line image, the line sensor camera 101 outputs the line image to the separated-image generating unit 211. The separated-image generating unit 211 distributes the line images input from the line sensor camera 101 to a first memory that records a first separated image and a second memory that records a second separated image, and thus generates a first separated image and a second separated image. Distribution of the line images input from the line sensor camera 101 may be performed, for example, by switching the memory that is the output destination of the line image at each line image acquisition timing of the line sensor camera 101.

Further, for example, as illustrated in FIG. 13 and FIG. 14, it is also possible to generate a difference image without generating a photographed image and a separated image. In this case, it is not necessary to provide the separated-image generating unit 211 in the data processing unit 205, and line images input from the line sensor camera 101 are processed at the difference-image generating unit 213. At this time, the data processing unit 205 includes a delay memory 219 that stores one line image.

In the example in FIG. 13, line images that are input from the line sensor camera 101 are respectively output to a differentiating device 213a and also stored in the delay memory 219. The line image that is stored in the delay memory 219 is output to the differentiating device 213a at a delay that is equivalent to one line image acquisition timing. For example, the difference-image generating unit 213 outputs a line image acquired at a first line image acquisition timing (hereinafter, referred to as "first line image") to the differentiating device 213a, and also stores the first line image in the delay memory 219. At this time, output from the differentiating device 213a to a difference image memory that records a difference image is not performed.

Next, when a line image acquired at a second line image acquisition timing (hereinafter, referred to as "second line image") is input, the difference-image generating unit 213 similarly outputs the second line image to the differentiating device 213a and also stores the second line image in the delay memory 219. At such time, before the second line image is stored, the first line image is output from the delay memory 219 to the differentiating device 213a. The differentiating device 213a determines the difference between luminance values of the first line image and the second line image, and outputs the differences between these line images to a difference image memory. Thereafter, similar processing is repeated each time line images are input. By making it possible to directly calculate differences between luminance values from line images using the delay memory 219 in this way, a difference image can be generated without generating separated images.

Further, although in the example in FIG. 13 a configuration is adopted so as output differences between luminance values of line images to the difference image memory at intervals of every second line image acquisition timing, a configuration can also be adopted so as output differences between luminance values of line images to the difference image memory at each line image acquisition timing. For example, as illustrated in FIG. 14, a switch 213b that interchanges the order of line images for which a difference between luminance values is to be determined is provided between the delay memory 219 and the differentiating device 213a. With respect to the output of line images, the switch 213b can set an output A or an output B.

The output A outputs a line image acquired at an $n^{th}$ line image acquisition timing that is stored in the delay memory 219 (hereinafter, referred to as "$n^{th}$ line image") and a line image acquired at an $n+1^{th}$ line image acquisition timing (hereinafter, referred to as "$n+1^{th}$ line image") in that order to the differentiating device 213a. At such time, the differentiating device 213a subtracts the luminance values of the $n+1^{th}$ line image from the luminance values of $n^{th}$ line image to thereby calculate the difference therebetween. The output B interchanges the order of the n$^{th}$ line image that is stored in the delay memory 219 and the n+1$^{th}$ line image, and outputs the line images to the differentiating device 213a. At such time, the differentiating device 213a subtracts the luminance values of the n$^{th}$ line image from the luminance values of the n+1$^{th}$ line image to thereby calculate the difference therebetween.

The switch 213b is switched each time one line image is input from the line sensor camera 101. The differentiating device 213a calculates a difference between the luminance values of line images each time one line image is input from the line sensor camera 101, and outputs the difference to the difference image memory. By this means, a difference image that is generated is the same size as the photographed image in which the line images acquired by the line sensor camera 101 are arranged in photographing order.

In this case, the size in the longitudinal direction of a difference image that is generated by the configuration illustrated in FIG. 11 to FIG. 13 is one-half of the size of the photographed image. This is because the first illumination light source 103 and the second illumination light source 105 are alternately caused to emit light, and it can also be said that the first separated images and second separated images in FIG. 11 and FIG. 12 and the difference images in FIG. 11 to FIG. 13 are images acquired at one-half of the photographing resolution of the line sensor camera 101. Therefore, it is desirable that the photographing resolution of the line sensor camera 101 is set to twice the required resolution.

Further, with respect to the first separated image and the second separated image in FIG. 11 and FIG. 12, interpolation processing may be performed to make the image size match the size of the photographed image. As the interpolation processing, for example, adjacent picture element interpolation (at the center on the upper side in FIG. 15) that interpolates a separated image by arraying two each of the respective line images in the manner of lines 1, 1, 3, 3, 5, 5, 7, 7 may be performed. Alternatively, linear interpolation (on the right on the upper side in FIG. 15) that interpolates the average values of luminance values of adjacent picture elements in adjacent line images with respect to the original image of a separated image may be performed.

On the lower side in FIG. 15, changes in the luminance values of picture elements 1 to 5 of the original image and changes in the luminance values of picture elements 1 to 9 of separated images subjected to interpolation processing are shown. It is found that although in a separated image on which adjacent picture element interpolation was performed, the changes in the luminance values are bumpy because interpolation is performed with identical luminance values, in the separated image on which linear interpolation was performed, the changes in the luminance values are smooth. Thus, it is possible to reproduce luminance changes that resemble the form of unevenness that is on the surface of the strip-shaped body S while maintaining the resolution of the original image, by performing linear interpolation with respect to the original image of a separated image.

Examples of images actually acquired are shown in FIG. 16 to FIG. 18. FIG. 16 shows a photographed image, a first separated image, a second separated image and a difference image obtained by the processing illustrated in FIG. 11. The size in the longitudinal direction of the first separated image, second separated image and difference image shown in FIG. 16 is one-half the size of the photographed image. When adjacent picture element interpolation is performed with respect to the first separated image and second separated image shown in FIG. 16, the size in the longitudinal direction of the first separated image, the second separated image and the difference image becomes the same as that of the photographed image, as illustrated in FIG. 17. When linear interpolation is performed on the first separated image and second separated image shown in FIG. 16, similarly to FIG. 17, the size in the longitudinal direction of the first separated image, the second separated image and the difference image becomes the same as that of the photographed image, as illustrated in FIG. 18. In addition, the separated images and difference image after interpolation are smoother images than the images in the example shown in FIG. 17 on which adjacent picture element interpolation was performed. Thus, it is possible to reproduce luminance changes that resemble the form of unevenness that is on the surface of the strip-shaped body S while maintaining the resolution of the original image, by performing linear interpolation with respect to the original image of a separated image.

Returning to the description of FIG. 10, the inclination calculation unit 215 is realized by, for example, a CPU, a ROM, a RAM and the like, and calculates an inclination of the surface of the strip-shaped body S based on a difference image generated by the difference-image generating unit 213. The inclination calculation unit 215 takes a difference image generated by the difference-image generating unit 213 as luminance difference data that represents differences in luminance values, and calculates a direction and magnitude of an inclination of the surface of the strip-shaped body S based on the relationship between luminance differences and the inclination of the surface of the strip-shaped body S.

The relationship between luminance differences and an inclination of the surface of the strip-shaped body S will now be described based on FIG. 19 and FIG. 20. For example, as illustrated in FIG. 19, assume that the surface of the strip-shaped body S is inclined by an inclination angle $\varphi$ when taking a horizontal plane perpendicular to the optical axis of the line sensor camera 101 as a reference. In the present embodiment the first illumination light source 103 and the second illumination light source 105 are installed so that the first angle $\theta_1$ and the second angle $\theta_2$ are substantially equal to each other. Therefore, in a case where the surface of the strip-shaped body S that is being kept level is photographed, a luminance difference between the luminance of reflection light of the first illumination light and the luminance of reflection light of the second illumination light which are detected by the line sensor camera 101 can be regarded as zero, except for a small difference corresponding to the correction constant due to a difference in wavelength. In this case, when an inclination in the longitudinal direction of the strip-shaped body S arises at the surface of the strip-shaped body S that is being kept level, the degrees of reflection of the respective illumination lights change and, as illustrated in FIG. 20, the luminance difference between the respective reflection lights changes.

FIG. 20 reveals that when the inclination of the graph near the origin point (i.e., the conversion coefficient) is denoted by $\alpha$, a luminance difference $\Delta L$ and the inclination angle $\varphi$ can be expressed by the relation $\Delta L = \alpha \times \varphi$. Hence, the inclination calculation unit 215 can convert each luminance difference $\Delta L$ into an inclination angle $\varphi$ of the surface by using the conversion coefficient $\alpha$ and a luminance difference $\Delta L$ of each picture element determined from the difference image. The inclination of the surface of the strip-shaped body S of interest corresponds to a tangent at the inclination angle $\varphi$ obtained by converting from the luminance difference. Hence, the inclination calculation unit 215 can calculate the inclination of the surface of the strip-shaped body S of interest by calculating $\tan \varphi$ which is the tangent at the calculated inclination angle φ. The inclination calculated in this manner expresses the direction of the inclination by whether its sign is positive or negative, and expresses the specific magnitude of the inclination by its absolute value.

Note that information relating to the conversion coefficient α that is specified in advance is stored in the storage unit 209, for example. When performing inclination calculation processing, the inclination calculation unit 215 acquires the information relating to the conversion coefficient from the storage unit 209, and converts the luminance difference into an inclination angle. By performing the above processing for all elements of the luminance difference data, the inclination calculation unit 215 obtains a data group of inclination values (in other words, map data relating to inclination values) for the entire surface of the strip-shaped body S. The data group of inclination values obtained in this manner serves as information for inspection that is used when inspecting the shape (specifically, surface shape) of the strip-shaped body S. Further, it is also possible to convert the information for inspection into an image by replacing inclination values included in the information for inspection with high/low of luminance values or gradations. By converting the generated map data relating to inclinations into an image to form an inclination image, it is also possible to perform shape inspection based on the inclination image.

Furthermore, the inclination calculation unit 215 can perform inspection of the shape of the surface of the strip-shaped body S by comparing the calculated inclination with a predetermined threshold value. That is, a threshold value for the inclination of the surface when an abnormal portion is present at the surface of the strip-shaped body S is specified in advance by performing known statistical processing or the like on the basis of past operation data or the like, and the threshold value is stored in the storage unit 209 or the like. It is then possible for the inclination calculation unit 215 to perform an inspection to determine whether an abnormal portion is present at the surface of the strip-shaped body S of interest by specifying the magnitude relation between the calculated inclination value and the threshold value.

The inclination calculation unit 215 outputs the data relating to the calculated inclination of the surface of the strip-shaped body S to the height calculation unit 217.

The height calculation unit 217 is realized by, for example, a CPU, a ROM, a RAM and the like, and calculates the height of the surface of the strip-shaped body S of interest by using the inclination of the surface of the strip-shaped body S calculated by the inclination calculation unit 215.

Specifically, the height calculation unit 217 integrates the inclination tan φ of the surface of the strip-shaped body S calculated by the inclination calculation unit 215 along the longitudinal direction of the strip-shaped body S, which is the relative movement direction of the line sensor camera 101 and the strip-shaped body S (in other words, the scanning direction of the line sensor camera 101), and thereby calculates the height of the surface of the strip-shaped body S.

By performing the aforementioned integrating processing for all elements of the data relating to inclinations of the surface, the height calculation unit 217 can obtain a data group relating to surface heights (in other words, map data relating to surface heights) for the entire surface of the strip-shaped body S. The data group relating to surface heights obtained in this manner serves as information for inspection that is used when inspecting the shape (specifically, surface shape) of the strip-shaped body S. Further, it is also possible to convert the information for inspection into an image by replacing values relating to surface heights included in the information for inspection with high/low of luminance values or gradations. By converting the generated map data relating to surface heights into an image to form a height image, it is also possible to perform shape inspection based on the height image.

The data processing unit 205 that is equipped with the aforementioned functions calculates an inclination of the surface of the strip-shaped body S, and upon ending processing to calculate information for inspection for inspecting the surface shape of the strip-shaped body S, the data processing unit 205 transmits information relating to the obtained processing result to the display control unit 207.

(Display Control Unit)

Returning to the description of FIG. 7, the display control unit 207 is realized by, for example, a CPU, a ROM, a RAM and an output device or the like. The display control unit 207 performs display control when displaying various processing results including calculation results of information for inspection relating to the surface shape of the strip-shaped body S which are transmitted from the data processing unit 205, on an output device such as a display that is included in the arithmetic processing apparatus 200, or an output device provided outside the arithmetic processing apparatus 200 or the like. By this means it is possible for a user of the shape inspection apparatus 10 to ascertain, on the spot, the results of various processing, such as the inclination or height of the surface of the strip-shaped body S.

(Storage unit) The storage unit 209 is realized by, for example, a RAM included in the arithmetic processing apparatus 200 according to the present embodiment or a storage device or the like. In the storage unit 209, various parameters and ongoing processes or the like that the arithmetic processing apparatus 200 according to the present embodiment needs to save when performing some sort of processing, or various databases and programs or the like are recorded as appropriate. It is possible for the data acquisition unit 201, the measurement control unit 203, the data processing unit 205, the display control unit 207 and the like to freely perform data read/write operations with respect to the storage unit 209.

An example of the functions of the arithmetic processing apparatus 200 according to the present embodiment has been illustrated in the foregoing. Each of the aforementioned constituent elements may be constituted using a general-purpose member or circuit, or may be constituted by hardware specialized for the function of each constituent element. Further, a CPU or the like may perform all of the functions of the respective constituent elements. Thus, the configuration that is utilized can be changed as appropriate, according to the technology level at the time of implementing the present embodiment.

Note that a computer program for realizing each function of the arithmetic processing apparatus according to the present embodiment as described above can be created and implemented in a personal computer or the like. Further, a computer-readable recording medium that stores such a computer program can also be provided. For example, the recording medium is a magnetic disk, an optical disc, a magneto-optical disk, a flash memory or the like. The aforementioned computer program may also be delivered via a network, for example, without using a recording medium.

1-3. Shape Inspection Method

Figure 21:
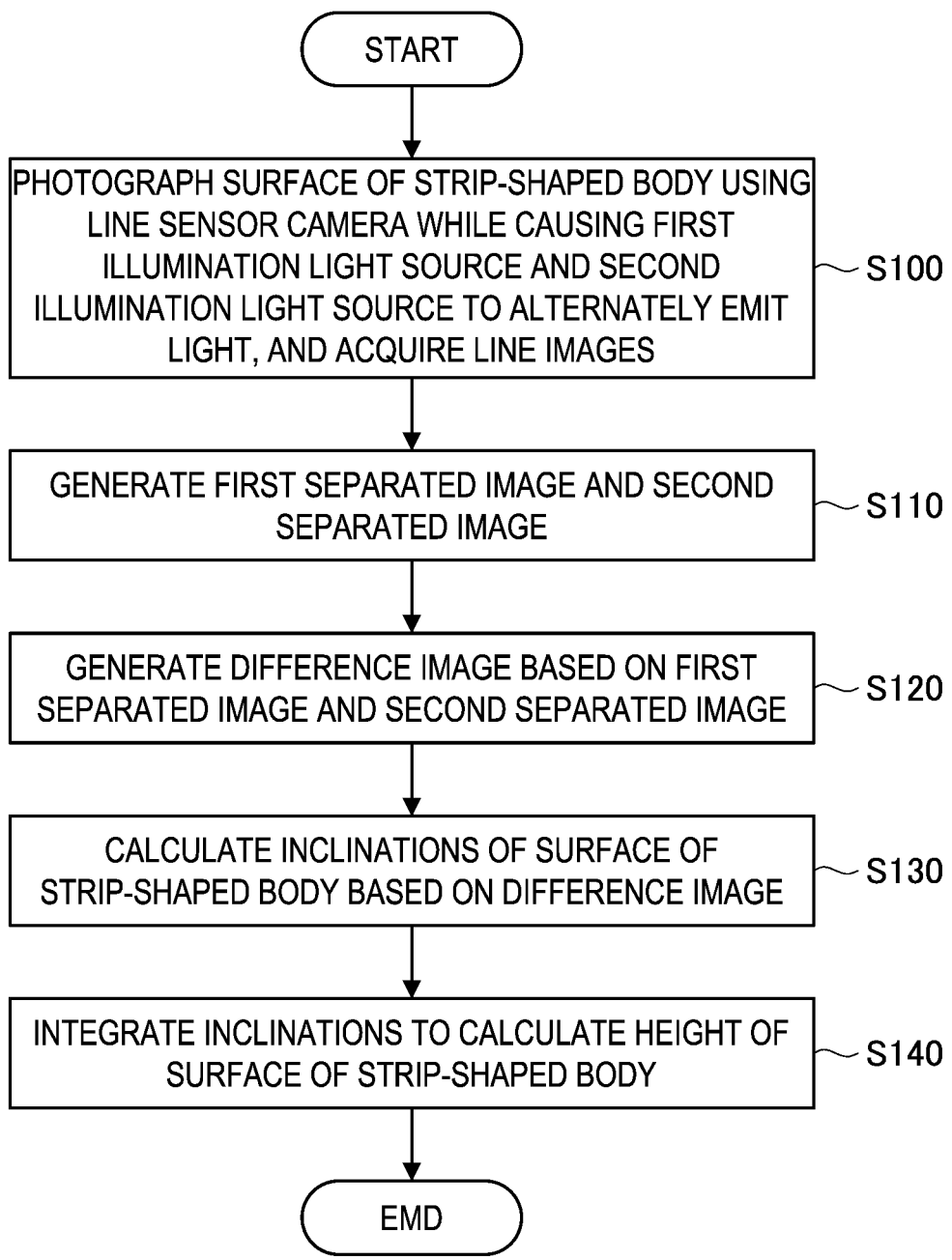
FIG. 21 is a flowchart illustrating an example of a shape inspection method according to the first embodiment.

One example of a shape inspection method that is performed using the shape inspection apparatus 10 according to the present embodiment will now be described based on FIG. 21. FIG. 21 is a flowchart illustrating an example of a shape inspection method according to the present embodiment.

As illustrated in FIG. 21, first, by means of the measurement apparatus 100 of the shape inspection apparatus 10, under control of the measurement control unit 203 of the arithmetic processing apparatus 200, based on the line speed, while causing the first illumination light source 103 and the second illumination light source 105 to sequentially light in an alternating manner, a predetermined region of the surface of the strip-shaped body S is photographed by means of the line sensor camera 101 at line image acquisition timings which are within light emission time periods in which illumination light is radiated at respective lighting timings, thereby acquiring line images (step S100). The line sensor camera 101 outputs the acquired line images to the arithmetic processing apparatus 200.

Next, the data acquisition unit 201 of the arithmetic processing apparatus 200 acquires the line images input from the measurement apparatus 100, and generates separated images at the separated-image generating unit 211 of the data processing unit 205 based on the line images input (S110). For example, as illustrated in FIG. 11, based on a photographed image, the separated-image generating unit 211 generates a first separated image composed of line images acquired by the line sensor camera 101 when a first illumination light is being radiated from the first illumination light source 103, and a second separated image composed of line images acquired by the line sensor camera 101 when a second illumination light is being radiated from the second illumination light source 105. The separated-image generating unit 211 then outputs the first separated image and second separated image generated to the difference-image generating unit 213.

The difference-image generating unit 213 generates a difference image based on the first separated image and the second separated image (S120). The difference-image generating unit 213 generates the difference image by calculating differences between luminance values at picture elements corresponding to the first separated image and second separated image. The difference-image generating unit 213 outputs the generated difference image to the inclination calculation unit 215.

Note that, although in step S110 and S120 a first separated image and a second separated image are generated based on a photographed image, and thereafter a difference image is generated, the present invention is not limited to this example. For example, as illustrated in FIG. 12, separated images may be generated without generating a photographed image. Alternatively, as illustrated in FIG. 13 and FIG. 14, a difference image may be generated without generating a photographed image, a first separated image and a second separated image. In addition, as illustrated in FIG. 15, when generating a separated image, interpolation processing may be performed with respect to the original image of the separated image.

Returning to the description of FIG. 21, the inclination calculation unit 215 that receives the difference image as input calculates an inclination of the surface of the strip-shaped body S based on the difference image (S130). The inclination calculation unit 215 takes the difference image as luminance difference data that represents differences in luminance values, and calculates a direction and magnitude of an inclination of the surface of the strip-shaped body S based on a relationship between luminance differences and inclination of the surface of the strip-shaped body S that is acquired beforehand. The inclination calculation unit 215 then outputs data relating to the calculated inclination to the height calculation unit 217. At such time, the inclination calculation unit 215 may output data relating to the calculated inclination to the display control unit 207 as information for inspection.

Thereafter, the height calculation unit 217 integrates inclinations included in the data relating to inclinations output from the inclination calculation unit 215, to thereby calculate the height of the surface of the strip-shaped body S (step S140). The height calculation unit 217 outputs the obtained data relating to the height of the surface of the strip-shaped body S to the display control unit 207 as information for inspection.

The display control unit 207 that receives the input of various kinds of information for inspection to be used for inspecting the surface of the strip-shaped body S may output the obtained results to a user or various kinds of devices that are provided externally. It is thereby possible for the user to ascertain inspection results relating to the shape of the strip-shaped body S.

1-4. Summary

The configuration of the shape inspection apparatus 10, and a shape inspection method for inspecting the strip-shaped body S using the shape inspection apparatus 10 according to the first embodiment of the present invention have been described above. According to the present embodiment, the first illumination light source 103 and the second illumination light source 105 are arranged so as to be symmetric with respect to the specular reflection direction of the optical axis of the line sensor camera 101, and based on the line speed, the first illumination light source 103 and the second illumination light source 105 are caused to emit light one by one in a successive manner at line image acquisition timings of the line sensor camera 101 so as to acquire a plurality of line images in a manner such that overlapping of the photographing ranges does not occur. The arithmetic processing apparatus 200 calculates an inclination of the surface of the strip-shaped body S based on a differential line image that is obtained based on line images acquired within the light emission time periods of the first illumination light source 103 and line images acquired within the light emission time periods of the second illumination light source 105.

According to the conventional technique, in order not to cause, as much as possible, a positional deviation with respect to the same inspection target region, line images are acquired within the respective light emission time periods of illumination lights radiated from two directions, and therefore the intervals between light emission and the light emission time periods of the two light sources as well as the exposure time period of the camera must be made small, and it has been difficult to support increases in the line speed. In contrast, according to the technique of the present embodiment, it is not necessary for a first line image that is acquired when a first illumination light source is emitting light and a second line image that is acquired when a second illumination light source is emitting light to be line images obtained by photographing the same region of the strip-shaped body S, and it suffices that a difference between the first line image and second line image obtained by photographing adjacent regions can be acquired.

According to the technique of the present embodiment, since it is not necessary to take into consideration positional deviations with respect to the same inspection target region as in the conventional technique, light emission time periods for illumination light can be set to a length that enables the obtainment of a sufficient quantity of light. Therefore, it is possible to acquire clearer line images by means of the line sensor camera 101, and it is also possible to detect the surface shape of the strip-shaped body S with high accuracy. Further, because the data processing load is lower than in the conventional technique, it is also possible to support increases in the line speed.

In addition, according to technique of the present embodiment, by making the photographing resolution of the line sensor camera 101 high, the resolution of the original image can be maintained in a difference image that is generated from separated images. By this means, it is possible to detect the surface shape of the strip-shaped body S with a higher degree of accuracy even without superimposing line images acquired by photographing the same inspection target region within the respective light emission time periods of the two illumination light sources.

Figure 22:
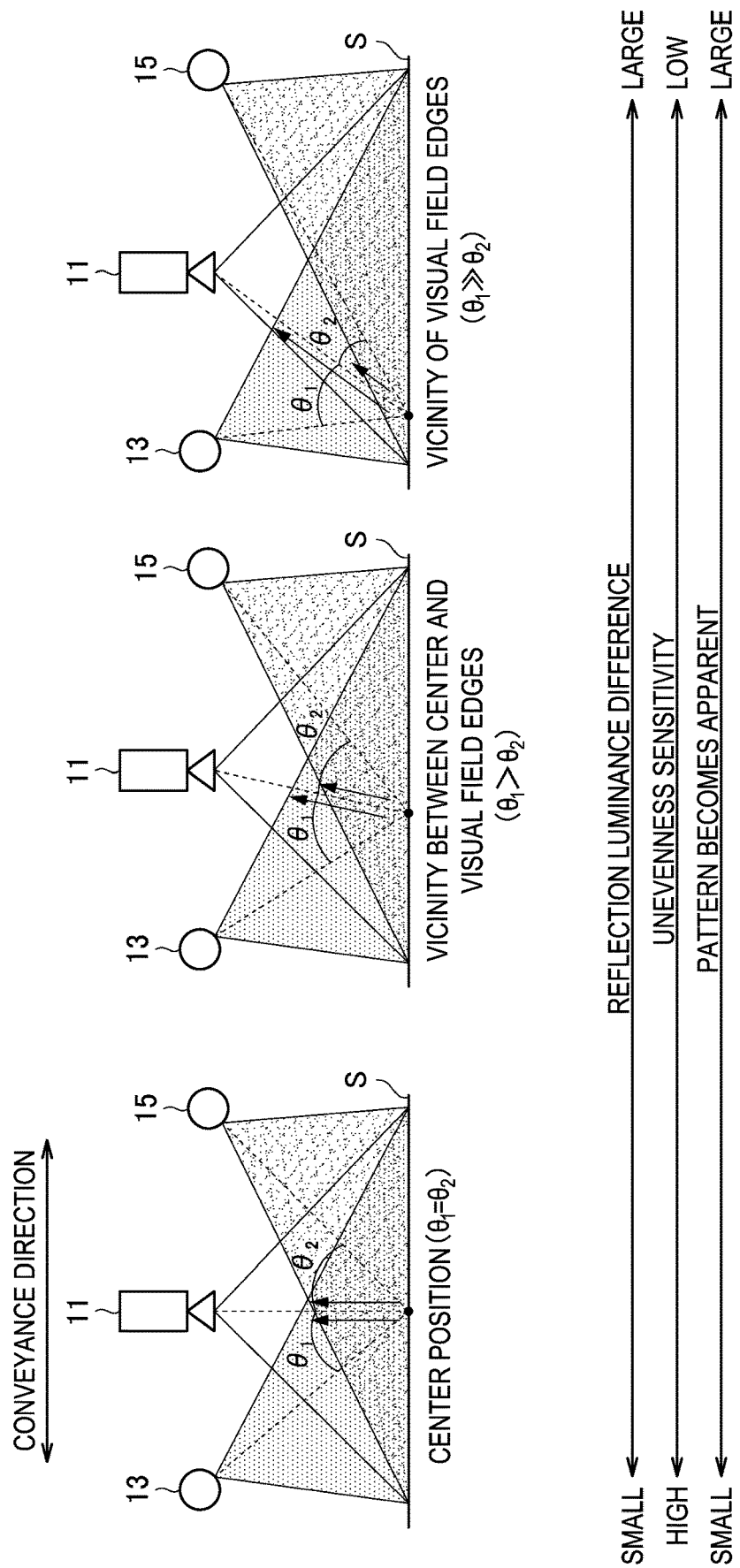
FIG. 22 is an explanatory diagram for describing luminance differences in reflection light that arise in the case of using an area camera.

Further, because an angle formed by the line sensor camera 101 and the first illumination light source 103 or the second illumination light source 105 in the conveyance direction of the strip-shaped body S at the conveyance line is always constant, the detection accuracy can be stably maintained. For example, as illustrated in FIG. 22, in a case of using an area camera 11 to photograph the surface of the strip-shaped body S that is illuminated by a first illumination light source 13 and a second illumination light source 15, the conveyance direction of the strip-shaped body S is also two-dimensionally photographed. Consequently, in a single photographed image photographed by the area camera 11, depending on the position in the longitudinal direction (that is, the conveyance direction) of the strip-shaped body S, a difference arises between a first angle $\theta_1$ formed by the optical axis of the area camera 11 and the optical axis of the first illumination light source 13 and a second angle $\theta_2$ formed by the optical axis of the area camera 11 and the optical axis of the second illumination light source 15.

As illustrated on the left side in FIG. 22, in the field of view of the area camera 11, the first angle $\theta_1$ and the second angle $\theta_2$ are identical at a center position at which the optical axis of the area camera 11 and the strip-shaped body S intersect. However, as illustrated in the center and on the right side in FIG. 22, a difference between the first angle $\theta_1$ and the second angle $\theta_2$ increases progressively as, in the field of view of the area camera 11, the position that is photographed moves from the center position toward either edge of the field of view. When an angle formed between the area camera 11 and the first illumination light source 13 or the second illumination light source 15 changes in this way, a difference in the luminance of reflection light at portion with unevenness of the strip-shaped body S changes, and the sensitivity with which unevenness is detected decreases. Further, in a case where there is a pattern on the surface of the strip-shaped body S, the pattern is made apparent as a result of differences arising between the luminance of reflection light, and a pattern that acts as a disturbance cannot be completely erased.

Figure 23:
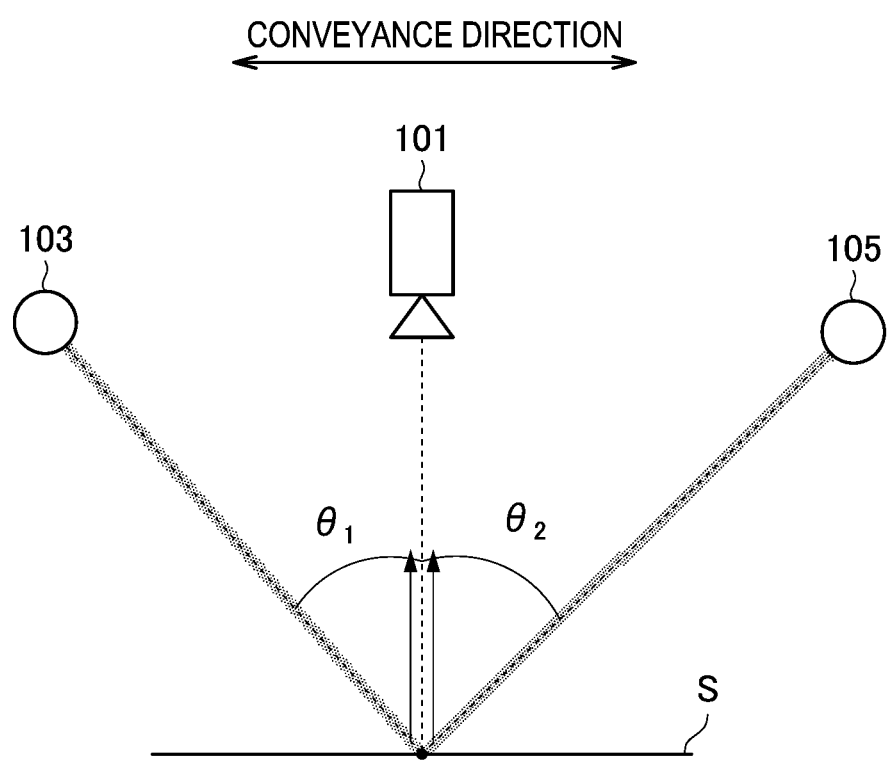
FIG. 23 is an explanatory diagram for describing reflection light that is received by a line sensor camera.

Therefore, as illustrated in FIG. 23, by using the line sensor camera 101 as in the shape inspection apparatus 10 according to the present embodiment, it is possible to cause only reflection light at a position at which the angles $\theta_1$ and $\theta_2$ that are formed by the specular reflection direction of the optical axis of the line sensor camera 101 and the optical axes of the first illumination light source 103 and the second illumination light source 105 are identical to be received. Therefore, since luminance differences in reflection light that occur in the case of using the area camera 11 do not arise, unevenness of the strip-shaped body S can be detected with high accuracy, and a pattern that acts as a disturbance can be reliably erased.

2. Second Embodiment

Figure 24:
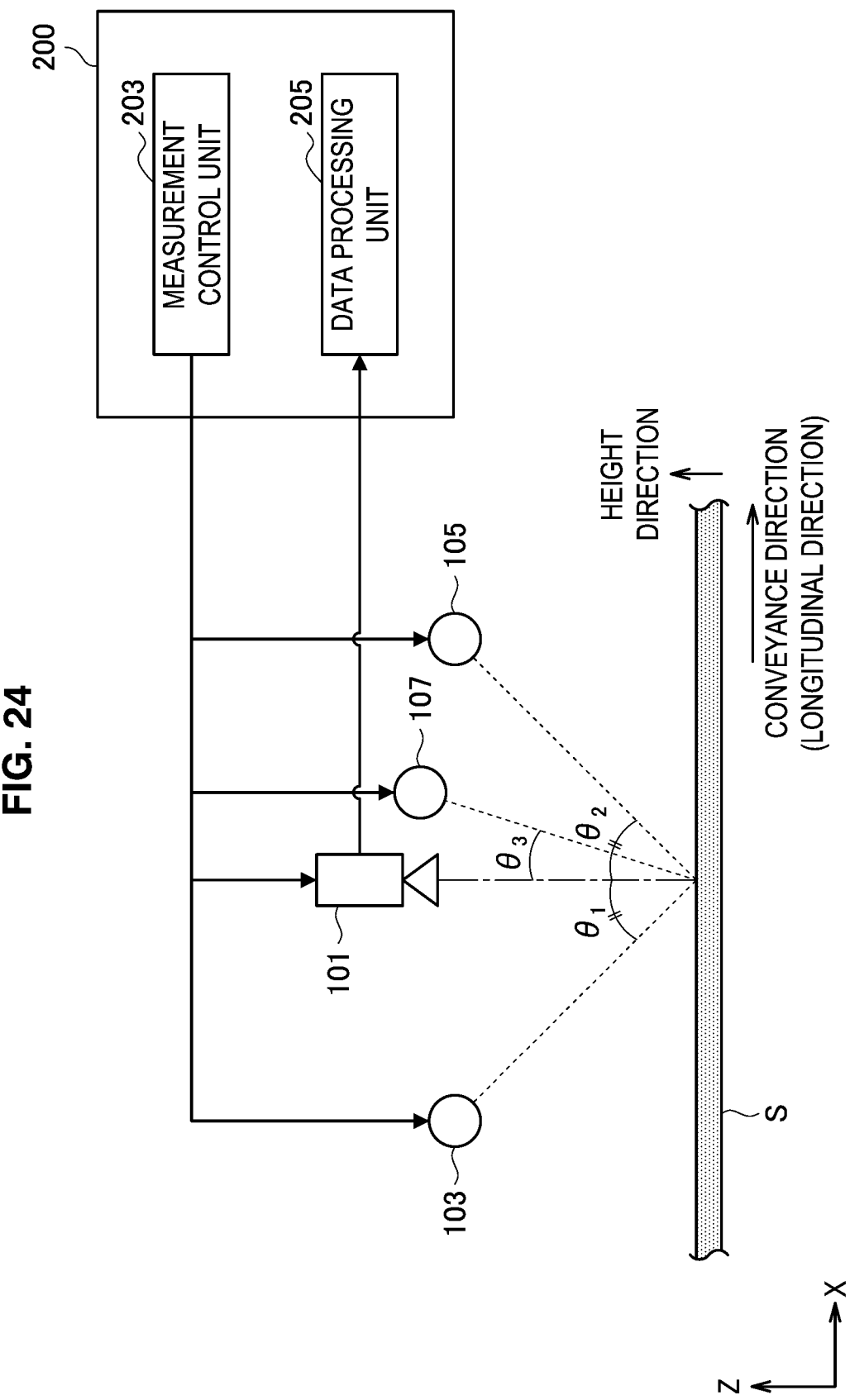
FIG. 24 is an explanatory diagram that schematically illustrates one configuration example of a measurement apparatus constituting part of a shape inspection apparatus according to a second embodiment of the present invention, and shows a state in which a strip-shaped body is viewed from a side face.

Next, the configuration and actions of a shape inspection apparatus according to a second embodiment of the present invention will be described based on FIG. 24. FIG. 24 is an explanatory diagram that schematically illustrates one configuration example of a measurement apparatus constituting part of the shape inspection apparatus according to the present embodiment, and shows a state in which a strip-shaped body S is viewed from a side face.

The shape inspection apparatus according to the present embodiment differs from the first embodiment in that the number of illumination light sources in the measurement apparatus 100 is increased compared to the first embodiment. By increasing the number of illumination light sources, it is possible to ascertain not only an inclination of the surface of the strip-shaped body S that is detected in the first embodiment, but also, for example, to ascertain in more detail the surface shape of the strip-shaped body S such as dirt such as rust or a striped pattern.

As illustrated in FIG. 22, the measurement apparatus 100 of the shape inspection apparatus 10 according to the present embodiment includes the line sensor camera 101, the first illumination light source 103, the second illumination light source 105 and a supplementary illumination light source 107. The line sensor camera 101, the first illumination light source 103, the second illumination light source 105 and the supplementary illumination light source 107 are fixed by known means so that their setting positions do not change. Note that, since the configuration of the line sensor camera 101, the first illumination light source 103 and the second illumination light source 105 are the same as the contents described based on FIG. 5 and FIG. 6, a description thereof will be omitted here.

Similarly to the first illumination light source 103 and the second illumination light source 105, the supplementary illumination light source 107 radiates strip-shaped illumination light (hereinafter, also referred to as "supplementary illumination light") onto the surface of the strip-shaped body S. The first illumination light source 103 and the second illumination light source 105 are used to calculate an inclination of the surface of the strip-shaped body S and detect unevenness on the surface of the strip-shaped body S. On the other hand, the supplementary illumination light source 107 is used to detect dirt such as rust or a striped pattern or the like. Therefore, the color of the supplementary illumination light of the supplementary illumination light source 107 need not be the same as the color of the first illumination light and second illumination light, and can be selected according to the color of the detection object that it is desired to detect using the supplementary illumination light source 107.

Further, similarly to the first illumination light source 103 and the second illumination light source 105, the supplementary illumination light source 107 may be, for example, a rod-like LED light, or may be a light having a configuration in which a laser beam is expanded by a rod lens or the like into a linear shape. Further, as a visible-light source utilized for the first illumination light source 103 and the second illumination light source 105, a light source that uses a single-wavelength laser beam or an LED may be used, or a light source with a continuous spectrum may be used.

The supplementary illumination light source 107 is arranged at a different position to the first illumination light source 103 and the second illumination light source 105. For example, as illustrated in FIG. 24, an angle (third angle: $\theta_3$) formed by the optical axis of the supplementary illumination light source 107 and the specular reflection direction of the optical axis of the line sensor camera 101 is different from the first angle $\theta_1$ that is formed by the optical axis of the first illumination light source 103 and the specular reflection direction of the optical axis of the line sensor camera 101 and the second angle $\theta_2$ that is formed by the optical axis of the second illumination light source 105 and the specular reflection direction of the optical axis of the line sensor camera 101. The third angle $\theta_3$ is set according to the detection object to be detected using the supplementary illumination light source 107, and may be set to a smaller angle than the first angle $\theta_1$ and the second angle $\theta_2$ as illustrated in FIG. 24 or may be set to a larger angle than the first angle $\theta_1$ and the second angle $\theta_2$.

The first illumination light source 103, the second illumination light source 105 and the supplementary illumination light source 107 are caused to emit light one by one in a successive manner based on control information from the measurement control unit 203 of the arithmetic processing apparatus 200. The line sensor camera 101 photographs the surface of the strip-shaped body S within the respective light emission time periods of the first illumination light source 103 and the second illumination light source 105. Accordingly, a photographed image acquired with the line sensor camera 101 is an image in which line images acquired while the first illumination light source 103 is being lit, line images acquired while the second illumination light source 105 is being lit, and line images acquired while the supplementary illumination light source 107 is being lit are arranged in the longitudinal direction in accordance with the lighting order of the illumination light sources.

Based on the photographed image acquired in this way, in a similar manner to the first embodiment, at the data processing unit 205, the arithmetic processing apparatus 200 generates separated images by separating the respective line images acquired when the illumination light sources 103, 105 and 107 are lighting, respectively. Then, similarly to the first embodiment, the first separated image and the second separated image are used to generate a difference image at the difference-image generating unit 213, and thereafter processing is performed by the inclination calculation unit 215 and the height calculation unit 217 to acquire an inclination and height of the surface of the strip-shaped body S. On the other hand, with regard to the separated image composed of line images acquired when the supplementary illumination light source 107 is lit, for example, a detect target such as dirt such as rust or a pattern is detected using only the separated image in question or by comparison with the first separated image or the second separated image.

By installing a plurality of illumination light sources and causing the illumination light sources to emit light one by one in a successive manner and photographing the surface of the strip-shaped body S at the respective lighting timings by means of the line sensor camera 101 in this way, the surface shape of the surface of the strip-shaped body S can be ascertained in more detail.

Note that, although in the above description it is described that a photographed image and separated images are generated based on line images acquired by the line sensor camera 101 within the respective light emission time periods of the first illumination light source 103, the second illumination light source 105 and the supplementary illumination light source 107, and a difference image is then acquired based on the separated images, the present invention is not limited to this example. Similarly to the first embodiment, when detecting unevenness of the surface of the strip-shaped body S, for example, as illustrated in FIG. 12, separated images may be generated without generating a photographed image. Alternatively, as illustrated in FIG. 13 and FIG. 14, a difference image may be generated without generating a photographed image, a first separated image and a second separated image. In addition, as illustrated in FIG. 15, when generating a separated image, interpolation processing may be performed with respect to the original image of the separated image.

Further, although only one supplementary illumination light source is provided in the example in FIG. 24, the present invention is not limited to this example, and a plurality of supplementary illumination light sources may be provided. Providing a plurality of supplementary illumination light sources enables the surface shape of the strip-shaped body S to be ascertained in greater detail since the surface shape that is detectable can be increased. At such time, the lighting timings and light emission time periods of the plurality of supplementary illumination light sources may differ from the lighting timings and light emission time periods of the first illumination light source 103 and the second illumination light source 105.

For example, assume that a first supplementary illumination light source and a second supplementary illumination light source are provided as supplementary illumination light sources. At such time, the lighting sequence of the four illumination light sources, that is, the first illumination light source 103 (referred to as "light source 1"), the second illumination light source 105 (referred to as "light source 2"), the first supplementary illumination light source (referred to as "light source 3") and the second supplementary illumination light source (referred to as "light source 4") may be set, for example, as shown in the following (a) or (b).

(a) Light source 1→light source 2→light source 3→light source 4→light source 1→light source 2→light source 3→light source 4→ . . . .

(b) Light source 1→light source 2→light source 3→light source 1→light source 2→light source 4→light source 1→ . . . .

The configuration of the shape inspection apparatus 10 according to the second embodiment of the present invention as well as a shape inspection method for inspecting the strip-shaped body S using the shape inspection apparatus 10 have been described above. According to the present embodiment, a further illumination light source (supplementary illumination light source) is provided in addition to the first illumination light source 103 and the second illumination light source 105. The surface shape of the strip-shaped body S can be ascertained in greater detail by installing a plurality of illumination light sources and causing the illumination light sources to emit light one by one in a successive manner and photographing the surface of the strip-shaped body S within the respective light emission time periods by means of the line sensor camera 101 to acquire line images.

3. Hardware Configuration Example

Figure 25:
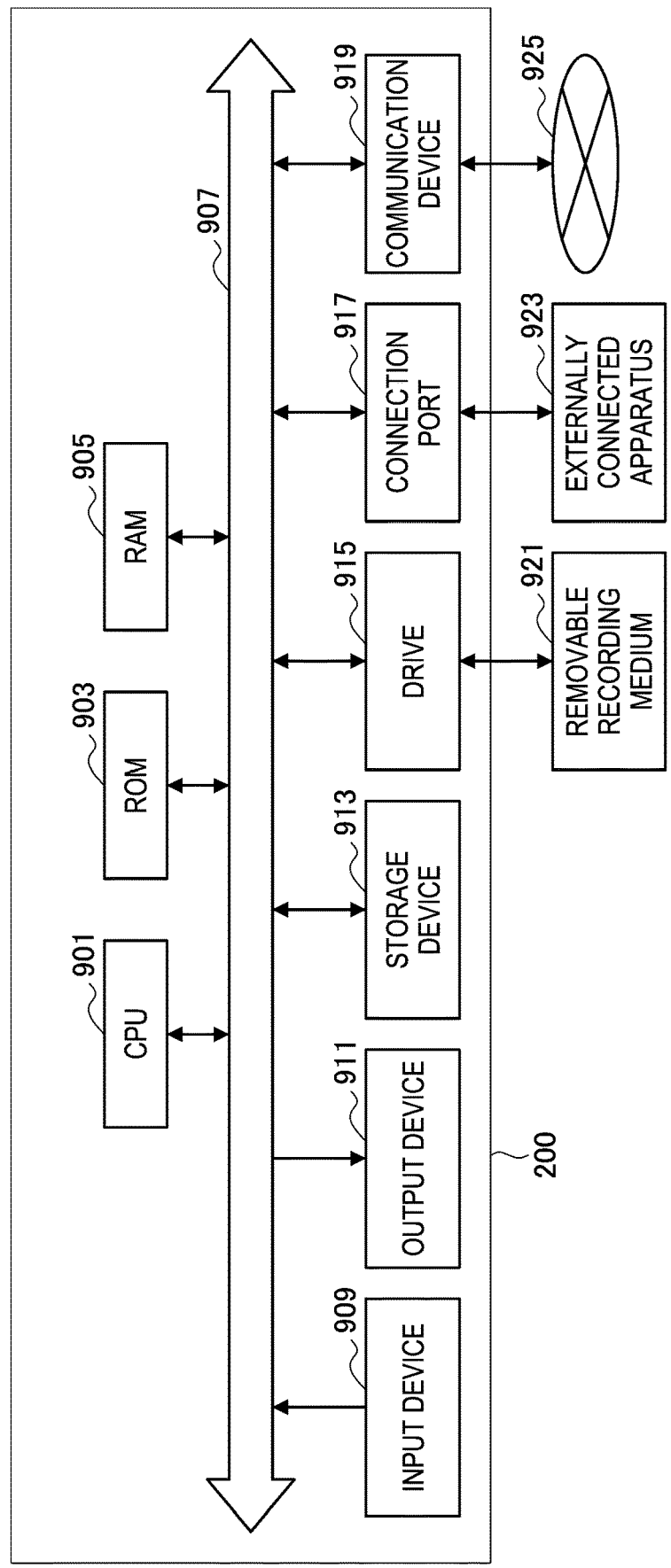
FIG. 25 is a block diagram illustrating a hardware configuration of an arithmetic processing apparatus according to the respective embodiments of the present invention.

The hardware configuration of the arithmetic processing apparatus 200 according to the above embodiments of the present invention will now be described in detail referring to FIG. 25. FIG. 25 is a block diagram illustrating the hardware configuration of the arithmetic processing apparatus 200 according to the respective embodiments of the present invention.

The arithmetic processing apparatus 200 mainly includes a CPU 901, a ROM 903, and a RAM 905. The arithmetic processing apparatus 200 also includes a bus 907, an input device 909, an output device 911, a storage device 913, a drive 915, a connection port 917, and a communication device 919.

The CPU 901 functions as an arithmetic processing apparatus and a control device, and controls the all or a part of the operations of the arithmetic processing apparatus 200 according to various programs recorded in the ROM 903, the RAM 905, the storage device 913, or a removable recording medium 921. The ROM 903 stores programs, operation parameters and the like used by the CPU 901. The RAM 905 primarily stores programs that the CPU 901 uses and parameters and the like that vary as appropriate during the execution of the programs. These components are connected with each other via the bus 907 that is constituted by an internal bus such as a CPU bus.

The bus 907 is connected to an external bus such as a PCI (Peripheral Component Interconnect/Interface) bus via a bridge.

The input device 909 is operation means that is operated by a user, such as, for example, a mouse, a keyboard, a touch panel, buttons, a switch and a lever. The input device 909 may be remote control means (a so-called "remote control") that utilizes, for example, infrared light or other radio waves, or may be an externally connected apparatus 923 such as a PDA conforming to the operation of the arithmetic processing apparatus 200. Furthermore, the input device 909 generates an input signal based on, for example, information which is input by a user with the above operation means, and is constituted by an input control circuit for outputting the input signal to the CPU 901. The user can input various data to the shape inspection apparatus 10 and can instruct the shape inspection apparatus 10 to perform processing by operating the input device 909.

The output device 911 is constituted by a device capable of visually or audibly notifying acquired information to a user. Examples of such a device include display devices such as a CRT display device, a liquid crystal display device, a plasma display device, an EL display device and lamps, audio output devices such as a speaker and a headphone, a printer, a mobile phone, and a facsimile machine. For example, the output device 911 outputs a result obtained by various kinds of processing performed by the arithmetic processing apparatus 200. More specifically, the display device displays, in the form of text or an image, a result obtained by various kinds of processing performed by the arithmetic processing apparatus 200. On the other hand, the audio output device converts an audio signal such as reproduced audio data or sound data into an analog signal, and outputs the analog signal.

The storage device 913 is a device used for storing data that is configured as an example of a storage unit of the arithmetic processing apparatus 200. The storage device 913 is constituted by, for example, a magnetic storage device such as an HDD (Hard Disk Drive), a semiconductor storage device, an optical storage device or a magneto-optical storage device. The storage device 913 stores programs to be executed by the CPU 901, various data, and various data obtained from the outside and the like.

The drive 915 is a reader/writer for recording media, and is built into the arithmetic processing apparatus 200 or attached externally thereto. The drive 915 reads information recorded on a mounted removable recording medium 921 such as a magnetic disk, an optical disk, a magneto-optical disk or a semiconductor memory, and outputs the read information to the RAM 905. Furthermore, the drive 915 can write to the mounted removable recording medium 921 such as a magnetic disk, an optical disk, a magneto-optical disk or a semiconductor memory. The removable recording medium 921 is, for example, a CD medium, a DVD medium, or a Blu-ray (registered trademark) medium. Further, the removable recording medium 921 may be a CompactFlash (CF; registered trademark), a flash memory, an SD memory card (Secure Digital Memory Card) or the like. The removable recording medium 921 may also be, for example, an IC card (Integrated Circuit Card) equipped with a non-contact IC chip, or an electronic device.

The connection port 917 is a port for directly connecting devices to the arithmetic processing apparatus 200. Examples of the connection port 917 include a USB (Universal Serial Bus) port, an IEEE1394 port, an SCSI (Small Computer System Interface) port and an RS-232C port. By connecting the externally connected apparatus 923 to the connection port 917, the arithmetic processing apparatus 200 directly acquires various data from the externally connected apparatus 923 and provides various data to the externally connected apparatus 923.

The communication device 919 is a communication interface constituted by, for example, a communication device for connecting to a communication network 925. The communication device 919 is, for example, a wired or wireless LAN (Local Area Network), Bluetooth (registered trademark), a communication card for WUSB (Wireless USB), or the like. Further, the communication device 919 may be a router for optical communication, a router for ADSL (Asymmetric Digital Subscriber Line), a modem for various kinds of communication, or the like. The communication device 919, for example, can transmit and receive signals and the like in accordance with a predetermined protocol such as TCP/IP on the Internet or to and from other communication devices. The communication network 925 that is connected to the communication device 919 is constituted by a network or the like which is connected via wire or wirelessly, and may be, for example, the Internet, a home LAN, infrared communication, radio wave communication, satellite communication or the like.

An example of a hardware configuration that is capable of realizing the functions of the arithmetic processing apparatus 200 according to the embodiments of the present invention has been described above. Each of the constituent elements described above may be constituted using general-purpose members, or may be constituted by hardware dedicated to the function of each constituent element. Accordingly, the hardware configuration to be used can be changed as appropriate according to the technical level at the time of carrying out the present embodiment.

EXAMPLES

Hereunder, the shape inspection apparatus according to the aforementioned embodiments of the present invention is described while showing specific examples. The examples described hereunder are merely an example of a shape inspection apparatus and a shape inspection method according to the present invention, and the shape inspection apparatus and shape inspection method according to the present invention are not limited to the examples described below.

In the present examples, detection of the surface shape of a steel plate was performed using a shape inspection apparatus having a configuration based on the first embodiment, and taking as detection targets a concave portion with a diameter of approximately 2 mm formed artificially in the surface of the steel plate, and a rust region at which rust has arisen at the surface of a steel plate. A line sensor camera was installed so that the optical axis thereof was perpendicular to the surface of the steel plate. A first illumination light source and a second illumination light source were installed at positions at an angle of 45° with respect to the optical axis of the line sensor camera, respectively, so as to be symmetric with respect to the specular reflection direction of the optical axis of the line sensor camera.

In the present examples, the line image acquisition timing of the line sensor camera and the lighting timings and light emission time periods of the first illumination light source and second illumination light source were set as illustrated in FIG. 8. As illustrated in FIG. 8, only either one of the first illumination light source and the second illumination light source was caused to emit light while the image sensor of the line sensor camera was exposed at a line image acquisition timing, to thereby prevent overlapping of a line image acquired when the first illumination light source is emitting light and a line image acquired when the second illumination light source is emitting light.

The photographing resolution (R) of the line sensor camera was set to 0.1 mm, and the photographing range (E1=E2=E) at the time of radiation of each illumination light was set to 0.2 mm. A light emission time period d of the first illumination light source and the second illumination light source was set to be the same as the exposure time period of the line sensor camera. The line speed (V) was set to 1 m/sec, the light emission time period d was set to 100 μsec based on the aforementioned Formula (2), and the photographing interval b was set to 100 μsec based on the aforementioned Formula (1).

Figure 26:
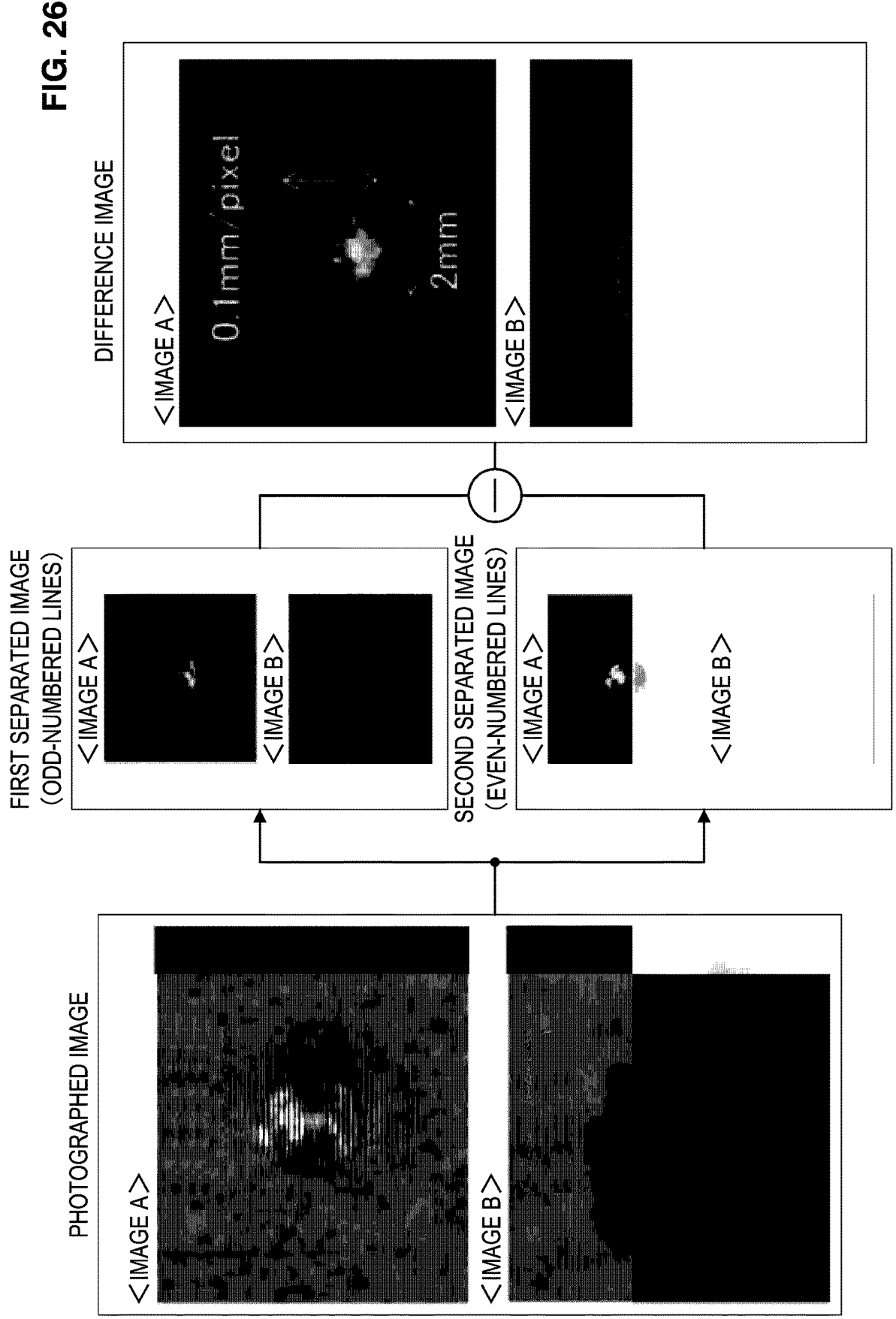
FIG. 26 is an explanatory diagram illustrating photographed images of a concave portion and a rust region as objects to be inspected, and separated images and difference images in an example.

A photographed image (image A) of the concave portion photographed by the line sensor camera, and a photographed image (image B) of the rust region photographed by the line sensor camera are shown on the left side in FIG. 26. First separated images and second separated images generated from these photographed images are shown at the center in FIG. 26. The concave portion and the rust region can each be recognized from the first separated images and second separated images. Difference images between the first separated images and second separated images are shown on the right side in FIG. 26. When the difference images were viewed, although the concave portion of the steel plate surface could be clearly recognized, the rust region did not appear in the difference images. It has thus been found that a surface shape having an inclination and height in a flat surface can be accurately detected by means of the shape inspection apparatus of the present invention.

On the other hand, in order to make a positional deviation between a first line image and a second line image not more than 0.2 times the resolution of the line sensor camera, as in Patent Document 2, the light emission time period d had to be made 20 μsec or less, and it was not possible to support the cycle time of a sequencer.

Whilst preferred embodiments of the present invention have been described in detail above with reference to the accompanying drawings, the present invention is not limited to the above examples. It is clear that a person having common knowledge in the field of the art to which the present invention pertains will be able to contrive various examples of changes and modifications within the category of the technical idea described in the appended claims, and it should be understood that they also naturally belong to the technical scope of the present invention.

For example, although in the foregoing embodiments a configuration is adopted so as to cause only either one of the first illumination light source and the second illumination light source to emit light at a line image acquisition timing of the line sensor camera so that a line image acquired when the first illumination light source is emitting light and a line image acquired when the second illumination light source is emitting light do not overlap, the present invention is not limited to this example. For example, there may be a slight overlap that unavoidably arises between the first separated image and the second separated image.

REFERENCE SIGNS LIST

10 Shape inspection apparatus
100 Measurement apparatus
101 Line sensor camera
103 First illumination light source
105 Second illumination light source
107 Supplementary illumination light source
200 Arithmetic processing apparatus
201 Data acquisition unit
203 Measurement control unit
205 Data processing unit
207 Display control unit
209 Storage unit
211 Separated-image generating unit
213 Difference-image generating unit
215 Inclination calculation unit
217 Height calculation unit
S Strip-shaped body

The invention claimed is:

1. A shape inspection apparatus for detecting a surface shape of a strip-shaped body, comprising:
    a line sensor camera configured to photograph a surface of the strip-shaped body to acquire a line image,
    a first illumination light source and a second illumination light source that are arranged so as to be symmetric with respect to a specular reflection direction of an optical axis of the line sensor camera, the first illumination light source and the second illumination light source being configured to successively and alternately radiate strip-shaped illumination light at a photographing position of the line sensor camera;
    a measurement control unit configured to control a lighting timing and a light emission time period of each of the first illumination light source and the second illumination light source, and a line image acquisition timing of the line sensor camera, and
    a data processing unit configured to process a plurality of line images acquired by the line sensor camera to calculate an inclination of the surface of the strip-shaped body,
    wherein:
    a line image acquired by the line sensor camera when a first illumination light is being radiated from the first illumination light source is taken as a first line image, and a line image acquired by the line sensor camera when a second illumination light is being radiated from the second illumination light source is taken as a second line image, the measurement control unit controls the lighting timing and the light emission time period as well as the line image acquisition timing based on a line speed so that photographing ranges are not overlapped between the first line image and the second line image, the line speed being a relative speed between the strip-shaped body and the line sensor camera, and the data processing unit calculates an inclination of the surface of the strip-shaped body based on a differential line image that is obtained based on the first line image and the second line image.

2. The shape inspection apparatus according to claim 1, wherein the measurement control unit provides, as a photographing interval, a time period in which photographing is not performed after previous photographing by the line sensor camera ends until subsequent photographing by the line sensor camera starts.

3. The shape inspection apparatus according to claim 2, wherein:

when a length in a conveyance direction of the strip-shaped body per picture element of the line sensor camera on the strip-shaped body is represented by "D", the measurement control unit controls the line image acquisition timing so that the photographing interval b satisfies the following formula:

$b \geq D/V.$

4. The shape inspection apparatus according to claim 1, wherein:

the data processing unit acquires, as the differential line image, a difference between a line image acquired at an $n^{th}$ line image acquisition timing and a line image acquired at at least either one of an $n-1^{th}$ line image acquisition timing and an $n+1^{th}$ line image acquisition timing, and calculates an inclination of the surface of the strip-shaped body.

5. The shape inspection apparatus according to claim 1, wherein:

the data processing unit acquires, as the differential line image, a difference between a line image acquired at an $n^{th}$ line image acquisition timing and a line image interpolated from a line image acquired at or prior to an $n-1^{th}$ line image acquisition timing and a line image acquired at or subsequent to an $n+1^{th}$ line image acquisition timing, and calculates an inclination of the surface of the strip-shaped body.

6. The shape inspection apparatus according to claim 1, wherein the data processing unit integrates inclinations of the surface of the strip-shaped body in a longitudinal direction to calculate a height of the surface of the strip-shaped body.

7. The shape inspection apparatus according to claim 1, further comprising:

at least one supplementary illumination light source that radiates strip-shaped illumination light at the strip-shaped body, wherein:

the measurement control unit causes the first illumination light source, the second illumination light source and the supplementary illumination light source to emit light successively one by one at a line image acquisition timing of the line sensor camera; and the data processing unit:

calculates an inclination of the surface of the strip-shaped body based on the differential line image that is obtained based on the first line image and the second line image, and identifies a surface state of the strip-shaped body based on a line image that is acquired by the line sensor camera when supplementary illumination light is being radiated from the supplementary illumination light source.

8. A shape inspection method for detecting a surface shape of a strip-shaped body, wherein, above a line on which the strip-shaped body is conveyed are arranged:

a line sensor camera configured to photograph a surface of the strip-shaped body to acquire a line image, and a first illumination light source and a second illumination light source that are arranged so as to be symmetric with respect to a specular reflection direction of an optical axis of the line sensor camera, the first illumination light source and the second illumination light source being configured to successively and alternately radiate strip-shaped illumination light at a photographing position of the line sensor camera, and wherein:

a line image acquired by the line sensor camera when a first illumination light is being radiated from the first illumination light source is taken as a first line image, and a line image acquired by the line sensor camera when a second illumination light is being radiated from the second illumination light source is taken as a second line image, a lighting timing and a light emission time period of the first illumination light source and the second illumination light source and a line image acquisition timing of the line sensor camera are controlled based on a line speed so that photographing ranges are not overlapped between the first line image and the second line image, the line speed being a relative speed between the strip-shaped body and the line sensor camera, and an inclination of the surface of the strip-shaped body is calculated based on a differential line image that is obtained based on the first line image and the second line image.

9. The shape inspection method according to claim 8, wherein a time period in which photographing is not performed after previous photographing by the line sensor camera ends until subsequent photographing by the line sensor camera starts is provided as a photographing interval.

10. The shape inspection method according to claim 9, wherein:

when a length in a conveyance direction of the strip-shaped body per picture element of the line sensor camera on the strip-shaped body is represented by "D", the line image acquisition timing is controlled so that the photographing interval b satisfies the following formula:

$b \geq D/V.$

11. The shape inspection method according to claim 8, wherein:

the differential line image is a difference between a line image acquired at an $n^{th}$ line image acquisition timing and a line image acquired at at least either one of an $n-1^{th}$ line image acquisition timing and an $n+1^{th}$ line image acquisition timing.

12. The shape inspection method according to claim 8, wherein:

the differential line image is a difference between a line image acquired at an $n^{th}$ line image acquisition timing and a line image interpolated from a line image acquired at or prior to an $n-1^{th}$ line image acquisition timing and a line image acquired at or subsequent to an n+1$^{th}$ line image acquisition timing.

13. The shape inspection method according to claim 8, wherein inclinations of the surface of the strip-shaped body are integrated in a longitudinal direction to further calculate a height of the surface of the strip-shaped body.

14. The shape inspection method according to claim 8, further comprising at least one supplementary illumination light source that radiates strip-shaped illumination light at the strip-shaped body, wherein:
- the first illumination light source, the second illumination light source and the supplementary illumination light source are caused to emit light successively one by one at a line image acquisition timing of the line sensor camera,
- an inclination of the surface of the strip-shaped body is calculated based on the differential line image that is obtained based on the first line image and the second line image, and
- a surface state of the strip-shaped body is identified based on a line image that is acquired by the line sensor camera when supplementary illumination light is being radiated from the supplementary illumination light source.

* * * * *